United States Patent
Miyazawa et al.

(10) Patent No.: US 10,051,174 B2
(45) Date of Patent: Aug. 14, 2018

(54) FOCUS ADJUSTMENT DEVICE AND FOCUS ADJUSTMENT METHOD

(71) Applicant: OLYMPUS CORPORATION, Hachioji-shi, Tokyo (JP)

(72) Inventors: Shingo Miyazawa, Hino (JP); Makoto Ikeda, Kunitachi (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/407,115

(22) Filed: Jan. 16, 2017

(65) Prior Publication Data
US 2017/0257556 A1  Sep. 7, 2017

(30) Foreign Application Priority Data
Jan. 18, 2016  (JP) .................. 2016-006984

(51) Int. Cl.
H04N 5/232 (2006.01)
G02B 7/38 (2006.01)
G02B 7/28 (2006.01)
H04N 5/235 (2006.01)
G02B 7/34 (2006.01)
G02B 7/09 (2006.01)
G02B 7/36 (2006.01)

(52) U.S. Cl.
CPC .......... H04N 5/23212 (2013.01); G02B 7/09 (2013.01); G02B 7/28 (2013.01); G02B 7/34 (2013.01); G02B 7/36 (2013.01); G02B 7/38 (2013.01); H04N 5/2353 (2013.01)

(58) Field of Classification Search
CPC .... H04N 5/23212; H04N 5/2353; G02B 7/38; G02B 7/28
See application file for complete search history.

(56) References Cited

U.S. PATENT DOCUMENTS

2008/0278618 A1* 11/2008 Matsumoto ........ H04N 5/23212
                                                    348/345
2013/0342750 A1* 12/2013 Foote ................. H04N 5/23212
                                                    348/349

FOREIGN PATENT DOCUMENTS

JP    2007-178480    7/2007
JP    2010-107578    5/2010

* cited by examiner

Primary Examiner — Ahmed A Berhan
(74) Attorney, Agent, or Firm — John C. Pokotylo; Pokotylo Patent Services

(57) ABSTRACT

A direction judgment unit calculates a first evaluation value based on an image signal of a first focus detection region among focus detection regions to judge a drive direction of a focus lens to be in focus and calculates a second evaluation value based on an image signal of at least one second focus detection region smaller than the first region, the focus detection regions being at least partly the same and being different in size. A control unit determines whether a change of the second evaluation value is a monotonous change when the focus lens is slightly driven a first number of times in a first direction judged on the basis of the first evaluation value and the focus lens is slightly driven a second number of times smaller than the first number of times in a second direction opposite to the first direction, and the control unit performs focus adjustment on the basis of the second evaluation value when the change of the second evaluation value is not a monotonous change.

21 Claims, 23 Drawing Sheets

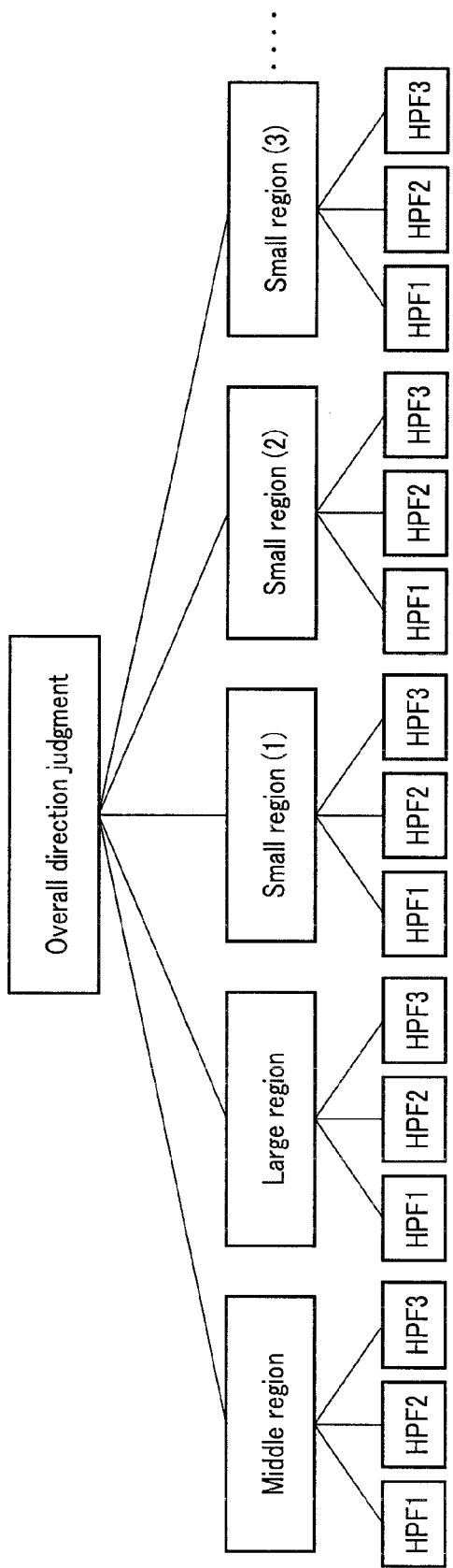
F I G. 5

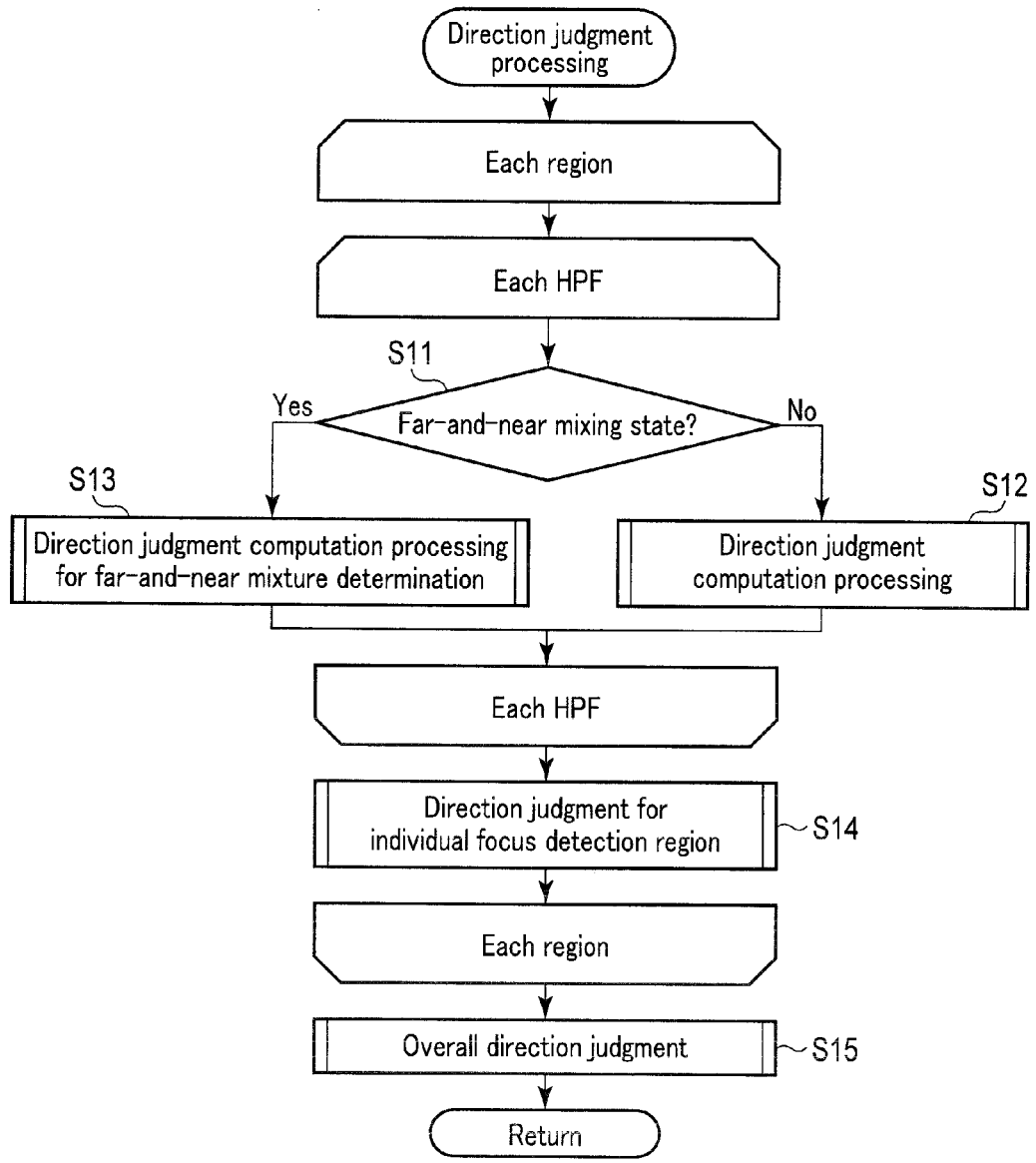
F I G. 6

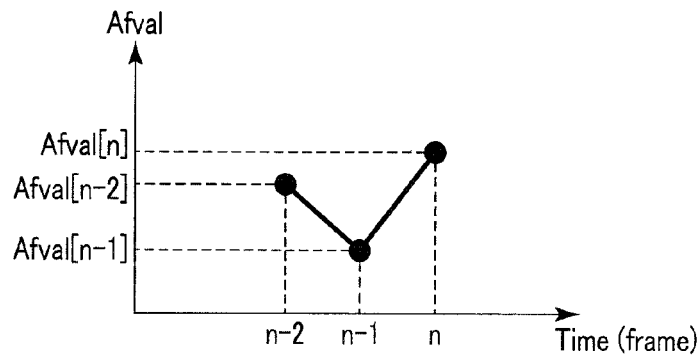
F I G. 11
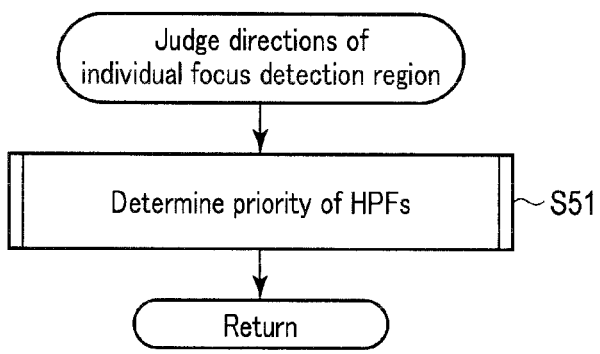
F I G. 12
| Priority | HPF1 | HPF2 | HPF3 |
|---|---|---|---|
| 1 | - | - | O |
| 2 | Same | Same | - |
| 3 | - | O | - |
| 4 | O | - | - |
F I G. 13

| Priority | Focus detection regions | | Overall |
|---|---|---|---|
| | | Direction | Direction |
| 1 | (5) | Near | Near |
| 2 | (8) | Near | Near |
| 3 | (4) | Near | Near |
| 4 | (6) | Near | Near |
| 5 | (2) | Near | Near |
| 6 | (7) | Near | Near |
| 7 | (9) | Near | Near |
| 8 | (1) | Near | Near |
| 9 | (3) | Near | Near |
| 10 | Middle | Near | Near |
| 11 | (5) | Far | Far |
| 12 | (8) | Far | Far |
| 13 | (4) | Far | Far |
| 14 | (6) | Far | Far |
| 15 | (2) | Far | Far |
| 16 | (7) | Far | Far |
| 17 | (9) | Far | Far |
| 18 | (1) | Far | Far |
| 19 | (3) | Far | Far |
| 20 | Middle | Far | Far |
| 21 | Large | Near | Near |
| 22 | Large | Far | Far |

| Contents of determination | Focus state | | | | Transition destination |
|---|---|---|---|---|---|
| | Unknown | Normal | Far-and-near mixing | Others | |
| Focus vicinity determination | – | ★ | – | – | Vicinity of focus |
| Normal subject determination | – | – | ★ | – | Normal |
| Far-and-near mixture determination | ★ | – | – | – | Far-and-near mixing or normal |

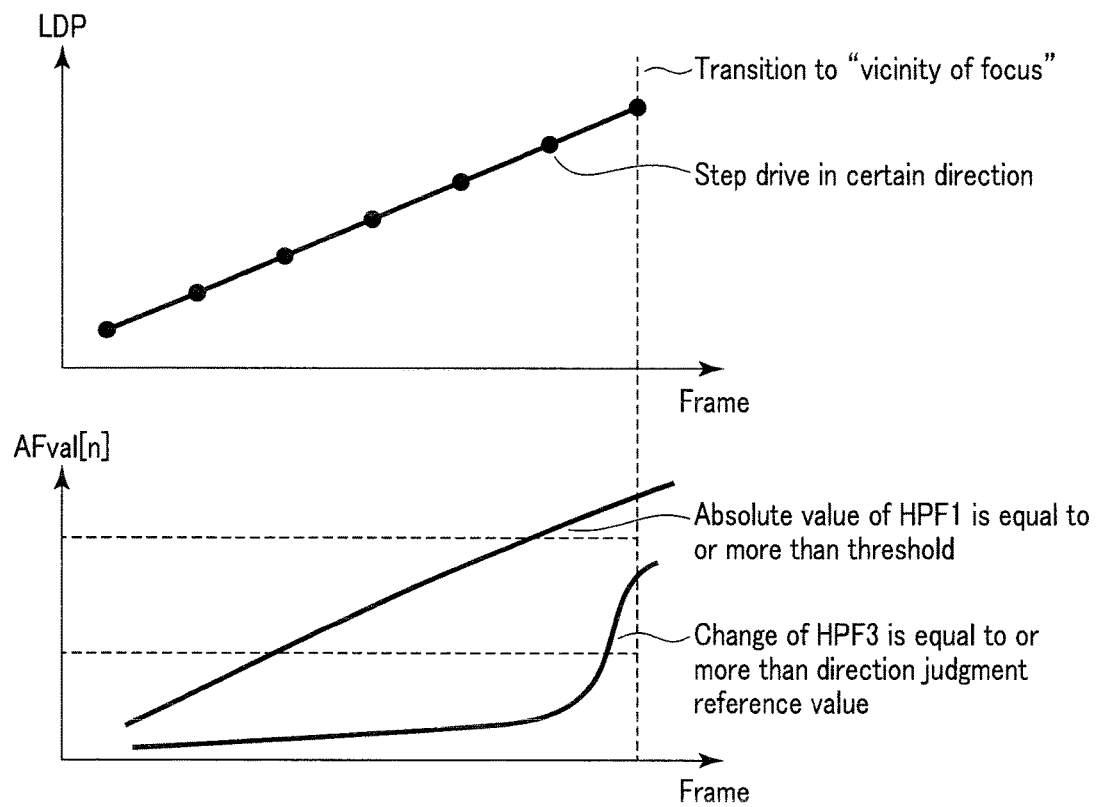
F I G. 20

| Focus state | Defocus amount | Image magnification variation |
|---|---|---|
| Unknown | $0.7F\delta$ | 0.0400% |
| Normal | $1 \sim 4F\delta$ | 0.1818% |
| Vicinity of focus | $0.5F\delta$ | 0.0400% |
| Panning | $1F\delta$ | 0.0400% |
| Far-and-near mixing | $1F\delta$ | 0.0400% |

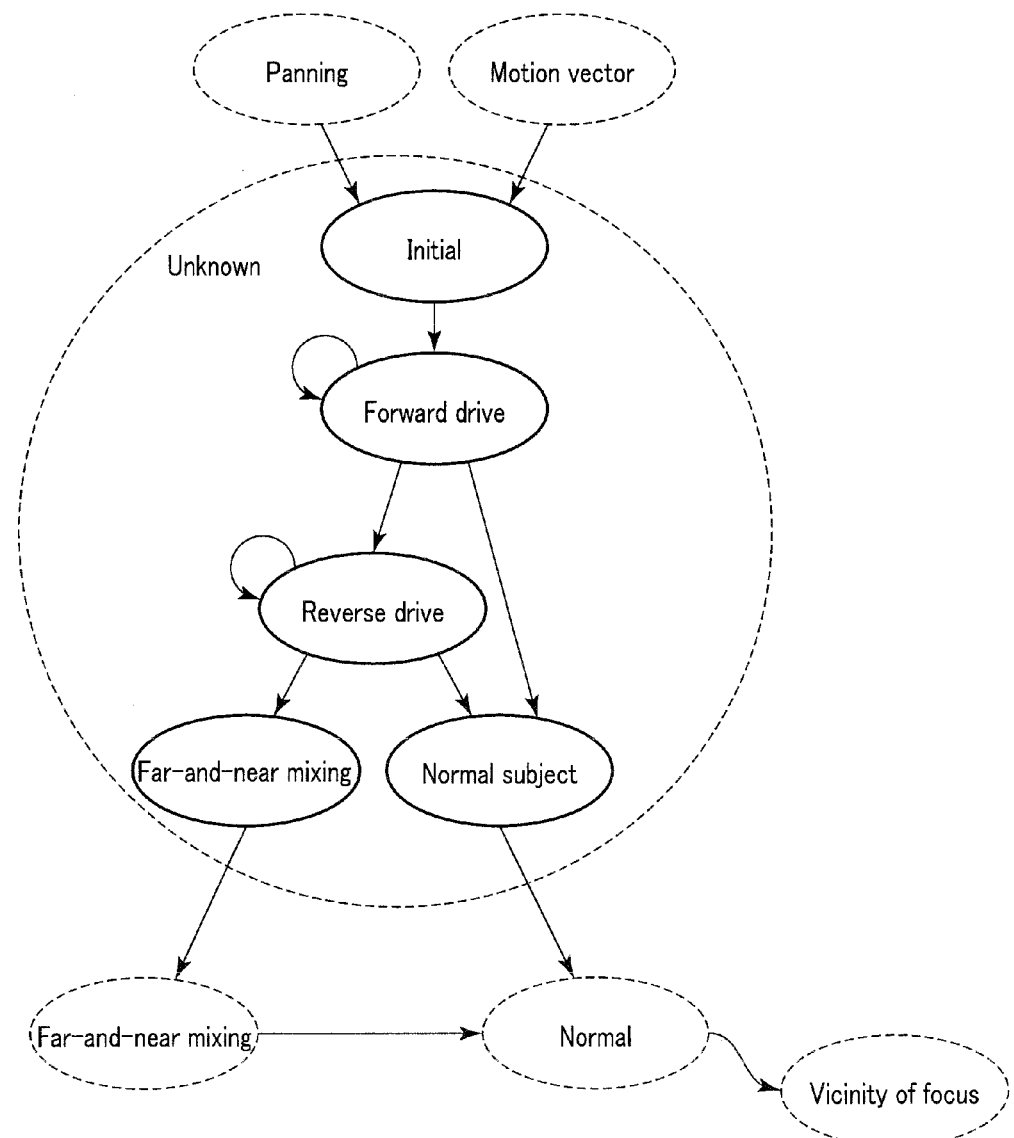
F I G. 26

| Determination conditions | | Various settings of next frame | | |
| --- | --- | --- | --- | --- |
| Direction judgment | Previous driving | Drive direction | Drive amount | Search phase |
| Far direction | Far | Near | 1.5 times as great as previous | To far-and-near mixture determination |
| Far direction | Near | Far | 1.5 times as great as previous | To far-and-near mixture determination |
| Near direction | Far | Near | 1.5 times as great as previous | To far-and-near mixture determination |
| Near direction | Near | Near | Same as previous | Remain waiting for reverse drive |
| Indeterminate | — | Previous direction | Same as previous | To normal subject determination |

F I G. 30

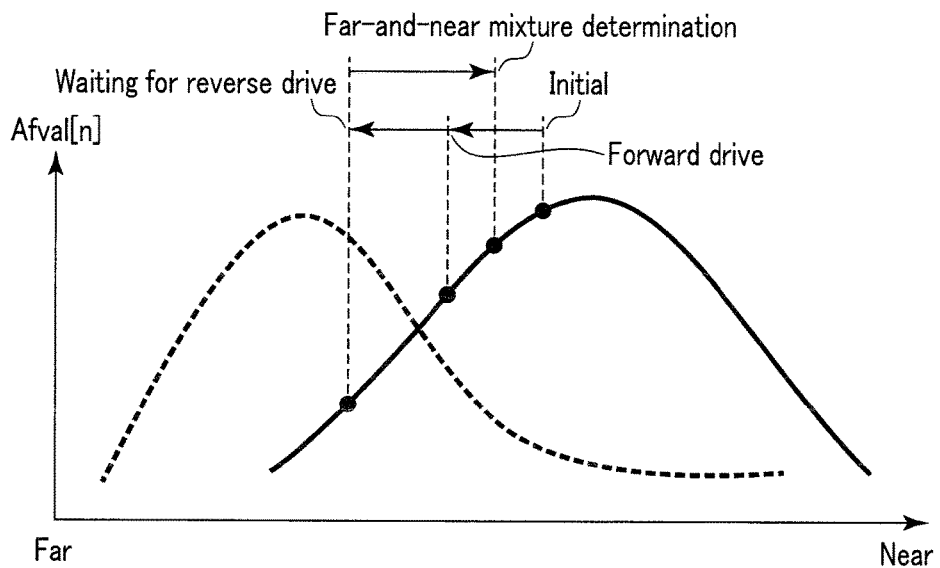
F I G. 31
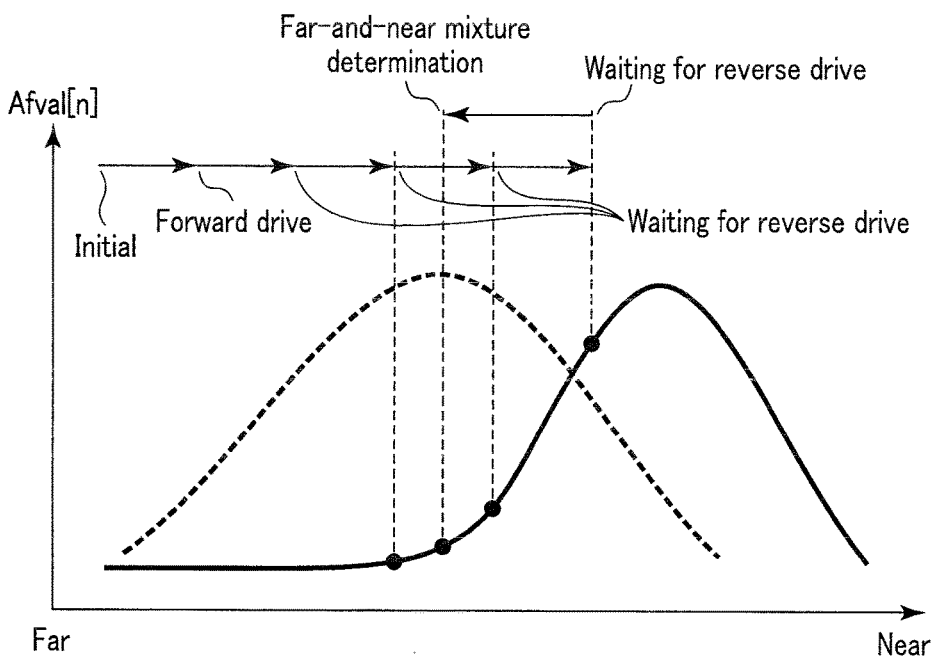
F I G. 32

FOCUS ADJUSTMENT DEVICE AND FOCUS ADJUSTMENT METHOD

CROSS-REFERENCE TO RELATED APPLICATIONS

This application is based upon and claims the benefit of priority from the prior Japanese Patent Application No. 2016-006984, filed Jan. 18, 2016, the entire contents of which are incorporated herein by reference.

BACKGROUND OF THE INVENTION

1. Field of the Invention

The present invention relates to a focus adjustment device and a focus adjustment method.

2. Description of the Related Art

As an automatic focus adjustment technique for an imaging lens provided in an imaging device, a contrast AF method is used. The contrast AF method is a method to adjust the focus of a focus lens on the basis of an evaluation value calculated from an image signal generated in accordance with a light flux received by an imager via an imaging lens. In the contrast AF method, for example, wobbling drive is performed to judge the drive direction of the focus lens to be in focus. The wobbling drive is a technique to judge the drive direction of the focus lens to be in focus by slightly driving the focus lens in a near direction and a far direction and comparing evaluation values in the driving in the near direction and the driving in the far direction.

Meanwhile, in the contrast AF method, there is a possibility that the focus lens may be focused on a subject different from a desired subject in a scene where subjects are mixed far and near. For example, Jpn. Pat. Appln. KOKAI Publication No. 2010-107578 and Jpn. Pat. Appln. KOKAI Publication No. 2007-178480 suggest techniques to enable suitable focus adjustment even in a scene where subjects are mixed far and near.

BRIEF SUMMARY OF THE INVENTION

A focus adjustment device according to a first aspect of the invention is a focus adjustment device which includes an imager to receive a light flux passing through an imaging lens including a focus lens and then generate an image signal and which performs focus adjustment on the basis of the image signal, the focus adjustment device comprising: a focus detection region setting unit which sets focus detection regions in a region of the imager where the light flux is received, the focus detection regions being at least partly the same and being different in size; a direction judgment unit which calculates a first evaluation value based on an image signal of a first focus detection region among the focus detection regions to judge a drive direction of the focus lens to be in focus, and calculates a second evaluation value based on an image signal of at least one second focus detection region smaller than the first focus detection region among the focus detection regions to judge a drive direction of the focus lens to be in focus; and a control unit which controls a focus adjustment operation on the basis of the drive direction judged by the direction judgment unit, wherein the control unit determines whether a change of the second evaluation value is a monotonous change when the focus lens is slightly driven a first number of times in a first direction judged on the basis of the first evaluation value and the focus lens is slightly driven a second number of times smaller than the first number of times in a second direction opposite to the first direction, and the control unit performs focus adjustment on the basis of the second evaluation value when the change of the second evaluation value is not a monotonous change.

A focus adjustment device according to a second aspect of the invention is a focus adjustment device which includes an imager to receive a light flux passing through an imaging lens including a focus lens and then generate an image signal and which performs focus adjustment on the basis of the image signal, the focus adjustment device comprising: a focus detection region setting unit which sets focus detection regions in a region of the imager where the light flux is received, the focus detection regions being at least partly the same and being different in size; a direction judgment unit which calculates a first evaluation value based on an image signal of a first focus detection region among the focus detection regions to judge a drive direction of the focus lens to be in focus, and calculates a second evaluation value based on an image signal of at least one second focus detection region smaller than the first focus detection region among the focus detection regions to judge a drive direction of the focus lens to be in focus; and a control unit which controls a focus adjustment operation on the basis of the direction judged by the direction judgment unit, wherein the control unit determines whether a far-and-near mixing subject is present from a change of the second evaluation value when the focus lens is slightly driven a first number of times in a first direction judged on the basis of the first evaluation value and the focus lens is slightly driven a second number of times smaller than the first number of times in a second direction opposite to the first direction, and the control unit performs focus adjustment on the basis of the second evaluation value when the far-and-near mixing subject is present.

A focus adjustment method according to a third aspect of the invention is a focus adjustment method to perform focus adjustment on the basis of an image signal from an imager which receives a light flux passing through an imaging lens including a focus lens and then generates the image signal, the focus adjustment method comprising: setting focus detection regions in a region of the imager where the light flux is received, the focus detection regions being at least partly the same and being different in size; judging a drive direction of the focus lens to be in focus on the basis of a first evaluation value based on an image signal of a first focus detection region among the focus detection regions; judging a drive direction of the focus lens to be in focus on the basis of a second evaluation value based on an image signal of at least one second focus detection region smaller than the first focus detection region among the focus detection regions; determining whether a change of the second evaluation value is a monotonous change when the focus lens is slightly driven a first number of times in a first direction judged on the basis of the first evaluation value and the focus lens is slightly driven a second number of times smaller than the first number of times in a second direction opposite to the first direction; and performing focus adjustment on the basis of the second evaluation value when the change of the second evaluation value is not a monotonous change.

A focus adjustment method according to a fourth aspect of the invention is a focus adjustment method to perform focus adjustment on the basis of an image signal from an imager which receives a light flux passing through an imaging lens including a focus lens and then generates the image signal, the focus adjustment method comprising: setting focus detection regions in a region of the imager where the light flux is received, the focus detection regions being at least partly the same and being different in size; judging a drive direction of the focus lens to be in focus on the basis of a first evaluation value based on an image signal of a first focus detection region among the focus detection regions; judging a drive direction of the focus lens to be in focus on the basis of a second evaluation value based on an image signal of at least one second focus detection region smaller than the first focus detection region among the focus detection regions; determining whether a far-and-near mixing subject is present from a change of the second evaluation value when the focus lens is slightly driven a first number of times in a first direction judged on the basis of the first evaluation value and the focus lens is slightly driven a second number of times smaller than the first number of times in a second direction opposite to the first direction; and performing focus adjustment on the basis of the second evaluation value when the far-and-near mixing subject is present.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 is a conceptual diagram of direction judgment processing;

FIG. 6 is a flowchart showing an example of the direction judgment processing;

FIG. 11 is a graph showing the relation between the elapse of time (frame) and the change of an evaluation value in the case of the far-and-near mixing state;

FIG. 12 is a flowchart showing direction judgment processing in individual focus detection region;

FIG. 13 is a diagram showing a table used in priority determination processing of HPFs;

FIG. 20 is a graph illustrating focus vicinity determination processing;

FIG. 26 is a state transition diagram of a search phase;

FIG. 30 is a diagram showing a table used in reverse drive instruction processing;

FIG. 31 is a graph showing the relation between the state of the search phase and lens drive, and is a graph in which the drive direction during the initial drive instruction processing is a "far" direction; and FIG. 32 is a graph showing the relation between the state of the search phase and lens drive, and is a graph in which the drive direction during the initial drive instruction processing is a "near" direction.

DETAILED DESCRIPTION OF THE INVENTION

Figure 1:
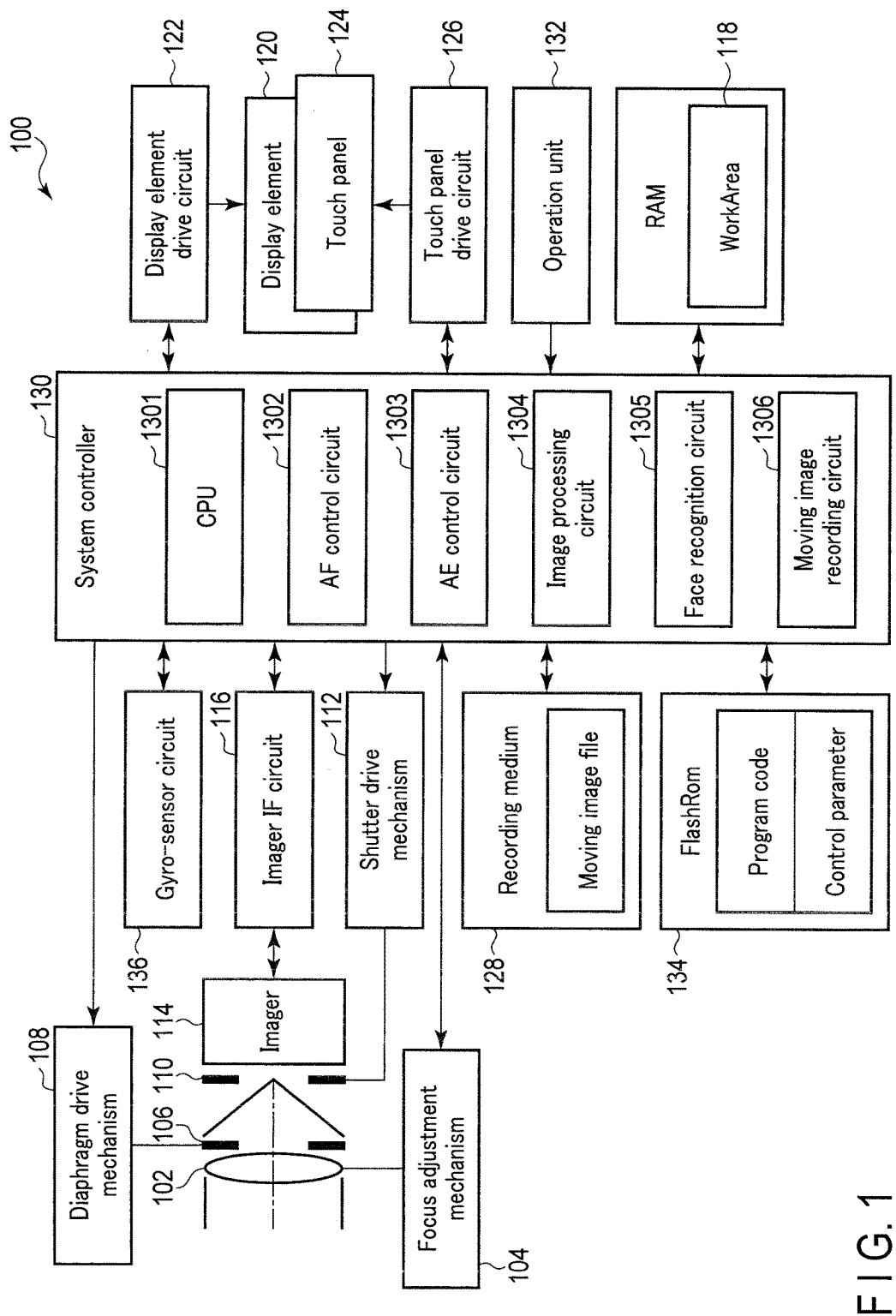
FIG. 1 is a block diagram showing the configuration of an example of an imaging device as an application example of a focus adjustment device according to one embodiment of the present invention.

Hereinafter, an embodiment of the present invention will be described with reference to the drawings. FIG. 1 is a block diagram showing the configuration of an example of an imaging device as an application example of a focus adjustment device according to one embodiment of the present invention. The imaging device includes devices such as digital cameras and smartphones as well as various imaging devices having focus lenses.

As shown in FIG. 1, an imaging device 100 includes an imaging lens 102, a focus adjustment mechanism 104, a diaphragm 106, a diaphragm drive mechanism 108, a shutter 110, a shutter drive mechanism 112, an imager 114, an imager interface (IF) circuit 116, a RAM 118, a display element 120, a display element drive circuit 122, a touch panel 124, a touch panel drive circuit 126, a recording medium 128, a system controller 130, an operation unit 132, a flash ROM 134, and a gyro-sensor circuit 136.

The imaging lens 102 is an optical system to guide a light flux from an unshown subject to a light receiving surface of the imager 114. The imaging lens 102 includes a focus lens. The focus lens is a lens to change the focus position of the imaging lens 102. The imaging lens 102 may be configured as a zoom lens. The imaging lens 102 may otherwise be configured to be attachable to and detachable from the imaging device 100.

The focus adjustment mechanism 104 includes a drive mechanism to drive the focus lens. The focus adjustment mechanism 104 drives the focus lens in its optical axis direction (chain line direction shown in the drawing) under the control of an AF control circuit 1302 of the system controller 130.

The diaphragm 106 adjusts the amount of the light flux that enters the imager 114 via the imaging lens 102.

The diaphragm drive mechanism 108 includes a drive mechanism to drive the diaphragm 106. The diaphragm drive mechanism 108 drives the diaphragm 106 under the control of a CPU 1301 of the system controller 130.

The shutter 110 is configured to allow the light receiving surface of the imager 114 to be blocked from light or exposed to light. The shutter 110 adjusts the exposure time of the imager 114 by the time in which the light receiving surface of the imager 114 is blocked from light.

The shutter drive mechanism 112 includes a drive mechanism to drive the shutter 110. The shutter drive mechanism 112 drives the shutter 110 under the control of the CPU 1301 of the system controller 130.

The imager 114 includes a light receiving surface to receive the light flux guided via the imaging lens 102. Two-dimensionally arranged pixels are provided in the light receiving surface of the imager 114. A color filter is provided on the light entrance side of the light receiving surface. This imager 114 generates an electric signal (hereinafter referred to as an image signal) corresponding to the light flux received in the light receiving surface.

The imager IF circuit 116 drives the imager 114 under the control of the CPU 1301 of the system controller 130. The imager IF circuit 116 also reads the image signal obtained in the imager 114, under the control of the CPU 1301 of the system controller 130. The imager IF circuit 116 then subjects the read image signal to analog processing such as correlated double sampling (CDS) processing and automatic gain control (AGC) processing. Further, the imager IF circuit 116 generates a digital signal (hereinafter referred to as image data) based on the analog-processed image signal.

The RAM 118 is, for example, an SCRAM, and has a work area. The work area is the storage area to temporarily store data generated in each part of the imaging device 100.

The display element 120 is, for example, a liquid crystal display (LCD). The display element 120 displays various images. The display element drive circuit 122 drives the display element 120 on the basis of the image data input from the CPU 1301 of the system controller 130.

The touch panel 124 is integrally formed on the display screen of the display element 120, and detects the position where the finger or the like of a user touches the display screen. The touch panel drive circuit 126 drives the touch panel 124, and outputs a touch detection signal from the touch panel 124 to the CPU 1301 of the system controller 130. The CPU 1301 detects a touch operation on the display screen by the user from the touch detection signal, and performs processing corresponding to the touch operation.

The recording medium 128 is, for example, a memory card. Moving image files obtained by moving image photography operation are recorded in the recording medium 128.

The system controller 130 includes, as control circuits to control the operation of the imaging device 100, the CPU 1301, the AF control circuit 1302, an AE control circuit 1303, an image processing circuit 1304, a face recognition circuit 1305, and a moving image recording circuit 1306. Functions similar to those of the system controller 130 may be obtained by software.

The CPU 1301 controls the operation of each of the blocks outside the system controller 130: the diaphragm drive mechanism 108, the shutter drive mechanism 112, the display element drive circuit 122, the touch panel drive circuit 126, and others, and the operation of each of the control circuits in the system controller 130.

The AF control circuit 1302 as a focus detector controls AF processing by a contrast AF method. The AF control circuit 1302 has a function of a focus detection region setting unit, a function of a direction judgment unit, and a function of a control unit. The AF control circuit 1302 sets focus detection regions in the image data. The AF control circuit 1302 then calculates evaluation values from the image data for the focus detection regions sequentially obtained via the imager 114 in response to the driving of the focus lens. The evaluation values are obtained, for example, by high pass filtering (HPF) of the image data in the focus detection regions. The AF control circuit 1302 judges the drive direction of the focus lens to be in focus on the basis of the evaluation values, and drives the focus lens to the focus position in accordance with the direction judgment result.

The AE control circuit 1303 controls AE processing on the basis of a subject luminance obtained from the image data or the like.

The image processing circuit 1304 performs various kinds of image processing for the image data. The image processing includes color correction processing, gamma (γ) correction processing, compression processing, and the like. The image processing circuit 1304 also decompresses compressed image data.

The face recognition circuit 1305 recognizes the face of a person in the image data by use of, for example, template matching. The AF processing and the AE processing can be performed on the basis of the face recognition result.

The moving image recording circuit 1306 controls the operation of moving image recording.

The operation unit 132 includes various operation members to be operated by the user. The operation unit 132 includes, for example, a release button, a moving image button, a mode button, a selection key, and a power button. The release button is an operation member to issue an instruction for still image photography. The moving image button is an operation member to issue an instruction for moving image photography. The mode button is an operation member to select photography setting of the imaging device 100. The selection key is an operation member to select or decide an item on, for example, a menu screen. The power button is an operation member to power on or off the imaging device.

The flash ROM 134 stores a program code for the CPU 1301 to perform various kinds of processing. The flash ROM 134 also stores various control parameters; for example, control parameters necessary for the operations of the imaging lens 102, the diaphragm 106, and the imager 114, and a control parameter necessary for the image processing in the image processing circuit 1304.

The gyro-sensor circuit 136 is a sensor to detect the posture change of the imaging device 100. The gyro-sensor circuit 136 detects the posture change of the imaging device 100, for example, by detecting an angular velocity generated in the imaging device 100.

The operation of the imaging device 100 as an application example of the focus adjustment device according to the present embodiment is described below. The operation described below is an operation during moving image AF which is AF processing during moving image recording.

Naturally, the imaging device 100 may also be configured to be capable of still image recording.

Figure 2:
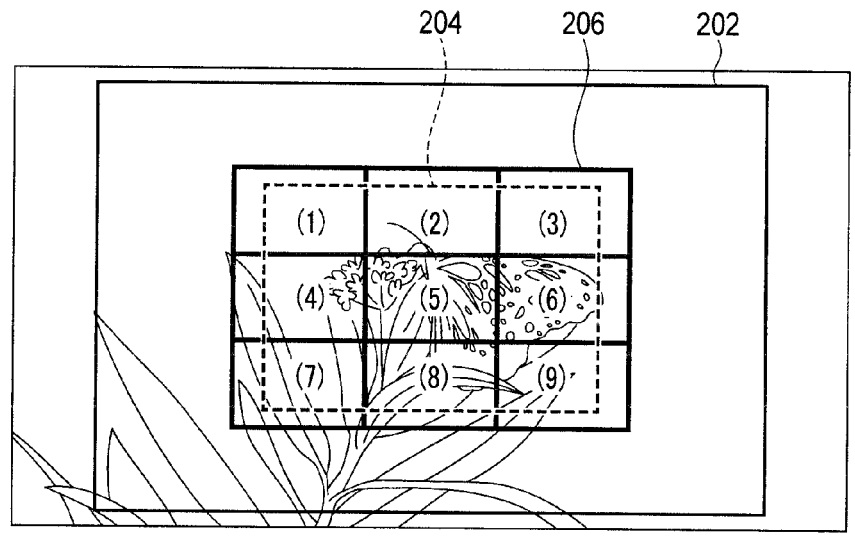
FIG. 2 is a diagram showing a large region, a middle region, and each of small regions.

In the present embodiment, the evaluation values are respectively calculated for a large region, a middle region, and small regions which are the focus detection regions set in a screen. FIG. 2 is a diagram showing the large region, the middle region, and each of the small regions. A large region 202 is set in the screen to have a predetermined size decided in consideration of the load of computation and the like. A middle region 204 at least partly overlaps the large region 202, and is set in the screen to have a size smaller than that of the large region 202. Small regions 206 at least partly overlap the large region 202 and the middle region 204, and are set in the screen to have a size smaller than that of the middle region 204. In FIG. 2, the large region 202 is set in the center of the screen. The middle region 204 is set inside the large region 202. Moreover, the small regions 206 are set in the upper left, upper center, upper right, middle left, middle center, middle right, lower left, lower center, and lower right of the middle region 204, respectively. In FIG. 2, the respective small regions are provided with the numbers (1) to (9).

Figure 3:
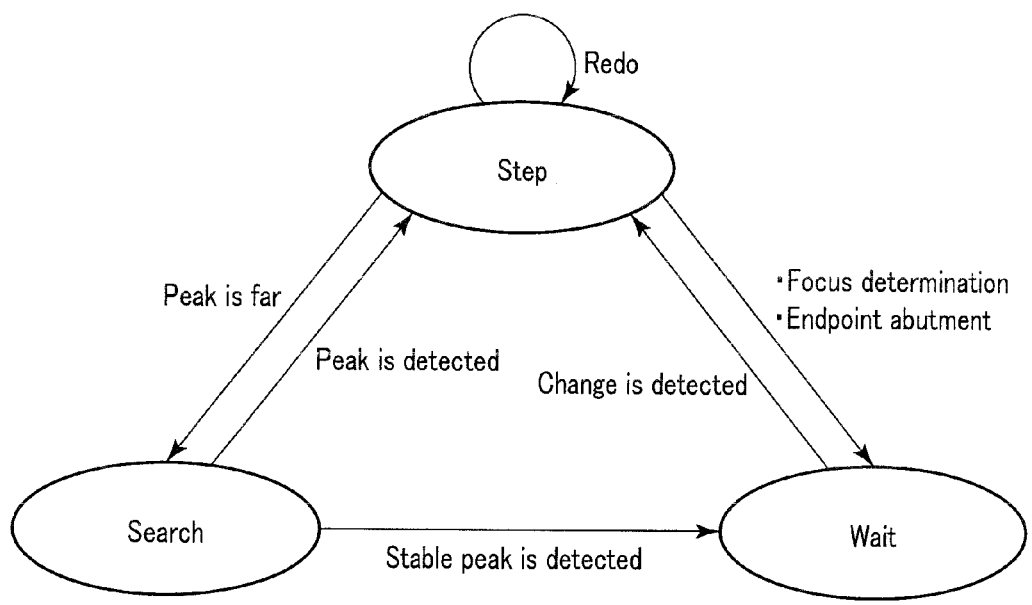
FIG. 3 is a diagram showing an overview of processing during moving image AF.

FIG. 3 is a diagram showing an overview of the processing during the moving image AF in the present embodiment. In the processing during the moving image AF by the imaging device in the present embodiment, the state makes the transition between three control phases comprising a "step phase", a "search phase", and a "wait phase". The step phase is a phase to drive the focus lens to the focus position by using both a slight amount of relative drive of the focus lens in one (first direction) of a near direction and a far direction and a slight amount of relative drive of the focus lens in a direction (second direction) opposite to the first direction. The step phase will be described later in detail. The search phase is a phase to drive the focus lens to the focus position while continuously driving the focus lens in the near direction or the far direction. The wait phase is a phase to wait for processing without driving the focus lens.

In the step phase, when it is determined that the lens position of the focus lens is far from the focus position, that is, when it is determined that a peak position of the evaluation value is far, the control phase makes the transition to the search phase. By the transition to the search phase, the focus lens rapidly moves to the vicinity of the focus position. In contrast, in the step phase, when it is determined that the lens position is the focus position, that is, when it is determined that a peak of the evaluation value is detected, the control phase makes the transition to the wait phase, and the lens drive is stopped. In the step phase, when it is determined that the focus lens has reached the focus position as well, the control phase makes the transition to the wait phase, and the lens drive is stopped.

In the search phase, when it is determined that the lens position is in the vicinity of the focus position, that is, when it is judged that the lens position is in the vicinity of the peak of the evaluation value, the control phase makes the transition to the step phase. Then the focus lens is moved to the focus position by step drive. In contrast, in the search phase, when it is determined that the lens position is the focus position, that is, when it is determined that the evaluation value has reached the peak and stable, the control phase makes the transition to the wait phase, and the lens drive is stopped.

In the wait phase, when the movement of the imaging device 100 is detected or when there is a change in, for example, the contrast of the image or in face information, that is, when a change in the condition of the imaging device or the subject is detected, the control phase makes the transition to the step phase. In this instance, the step drive is started so that the focus lens will be in focus.

Figure 4:
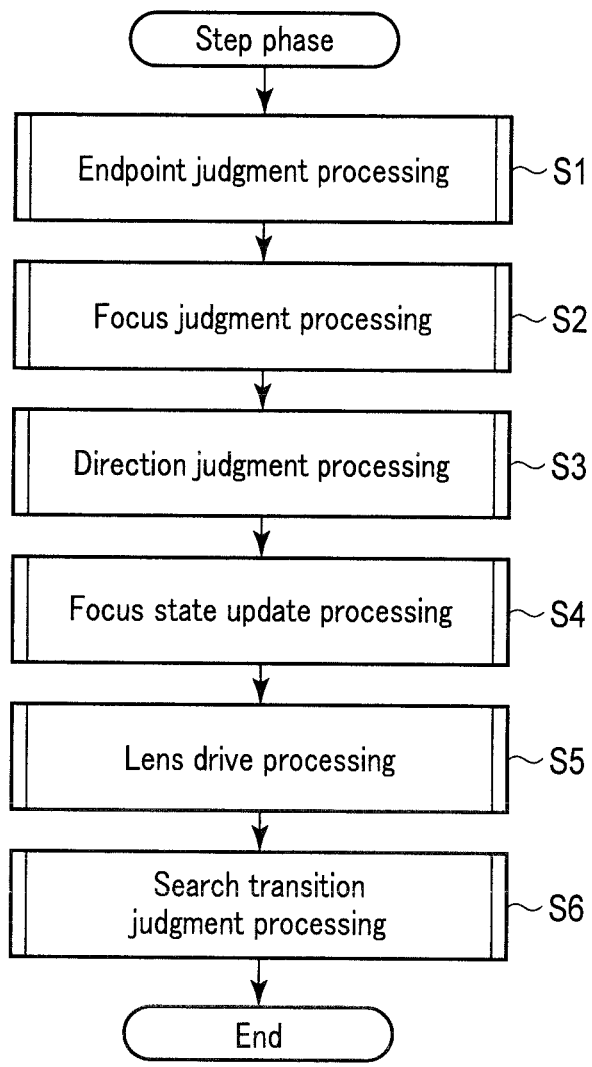
FIG. 4 is a flowchart showing overall processing in a step phase.

The step phase is further described below. FIG. 4 is a flowchart showing overall processing in the step phase. The processing in FIG. 4 is performed every frame of the moving image recording by the AF control circuit 1302, for example, after the moving image button is pushed by the user. The processing described below may be performed by a circuit other than the AF control circuit 1302 of the CPU 1301 or the like. The processing described below may be performed not only by a specific circuit but also by distributed processing.

In step S1, the AF control circuit 1302 performs endpoint judgment processing. In the endpoint judgment processing, the AF control circuit 1302 judges whether the current position of the focus lens is an endpoint position. When judging that the current position of the focus lens is an endpoint position on a near side or a far side, the AF control circuit 1302 judges whether to shift the processing to the wait phase or leave the processing in the step phase. For example, when the focus lens is not brought into focus even after the number of the executions of the step phase is beyond a predetermined number, the AF control circuit 1302 judges that the processing is to be shifted to the wait phase. When a change in the subject condition is detected in the wait phase, the AF control circuit 1302 shifts the processing to the step phase. The change in the subject condition is, for example, the change of contrast, the change of a motion vector, or the change of the movement of the imaging device 100.

When judging that the current position of the focus lens is not the endpoint position or that the step phase is to be continued, the AF control circuit 1302 shifts the processing to step S2. In step S2, the AF control circuit 1302 performs focus judgment processing. In the focus judgment processing, the AF control circuit 1302 judges whether the focus lens is in focus. Whether the focus lens is in focus is judged by the absolute value of the evaluation value or the change rate of the evaluation value. The AF control circuit 1302 judges that the focus lens is in focus, for example, when the absolute value of the evaluation value is equal to or more than a threshold or when the change rate of the evaluation value is in a certain range exceeding a threshold. In this case, the AF control circuit 1302 shifts the processing to the wait phase.

When judging that the focus lens is not in focus, the AF control circuit 1302 shifts the processing to step S3. In step S3, the AF control circuit 1302 performs direction judgment processing. The direction judgment processing is processing to judge the drive direction of the focus lens as the whole focus detection region. The direction judgment processing will be described later in detail.

In step S4, the AF control circuit 1302 performs focus state update processing. The processing then shifts to step S5. The focus state update processing is processing to update the current focus state in the moving image AF. In the present embodiment, different processing dependent on the focus state is performed. The focus state update processing will be described later in detail.

In step S5, the AF control circuit 1302 performs lens drive processing. The processing then shifts to step S6. The lens drive processing is processing to perform lens drive for focusing. The lens drive processing will be described later in detail.

In step S6, the AF control circuit 1302 performs search transition judgment processing. The processing in FIG. 4 then ends. In the search transition judgment processing, the AF control circuit 1302 judges whether to shift the control phase to the search phase, by the history of the past direction judgment results and the history of lens drive and the like. For example, when determining that the number of the switch of the drive direction of the focus lens in the step phase is beyond a threshold, the AF control circuit 1302 judges that the control phase is to be shifted to the search phase. When determining that the position of the focus lens is in the vicinity of the focus position in the search phase, the AF control circuit 1302 shifts the processing to the step phase. When it is judged that the control phase is not to be shifted to the search phase in the search transition judgment processing, the processing returns to step S1.

Next, the direction judgment processing is described. FIG. 5 is a conceptual diagram of the direction judgment processing. The direction in which the focus lens is to be driven is decided on the basis of the direction judgment result obtained in each of the focus detection regions: the large region 202, the middle region 204, and the nine small regions 206. As shown in FIG. 5, in each of the eleven focus detection regions, the drive direction of the focus lens is judged on the basis of the evaluation value obtained by three kinds of high pass filtering (HPF). Thus, the direction judgment processing in the present embodiment is hierarchically performed. Hereinafter, the three kinds of HPFs are referred to as HPF1, HPF2, and HPF3 in ascending order of cut-off frequency.

FIG. 6 is a flowchart showing an example of the direction judgment processing. First, the AF control circuit 1302 performs loop processing for each of the focus detection regions. For example, the focus detection regions are selected in the order from the upper right small region to the lower left small region, and then selected in the order of the middle region and the large region. The selecting order of the focus detection regions may be a different selecting order.

In the loop processing for each of the focus detection regions, the AF control circuit 1302 performs loop processing for each of the HPFs. The HPFs are selected, for example, in the order of the HPF1, the HPF2, and the HPF3. The selecting order of the HPFs may be a different selecting order.

In step S11 which is the start of the processing for each of the HPFs, the AF control circuit 1302 determines whether the state is a far-and-near mixing state. The far-and-near mixing state is a state where subjects at different distances are suspected to be mixed in the currently selected focus detection region. In step S11, it is determined that the state is the far-and-near mixing state when a "far-and-near mixing determination" is made in the search phase that will be described later. When it is determined in step S11 that the state is not the far-and-near mixing state, the processing shifts to step S12. When it is determined in step S11 that the state is the far-and-near mixing state, the processing shifts to step S13.

Figure 7:
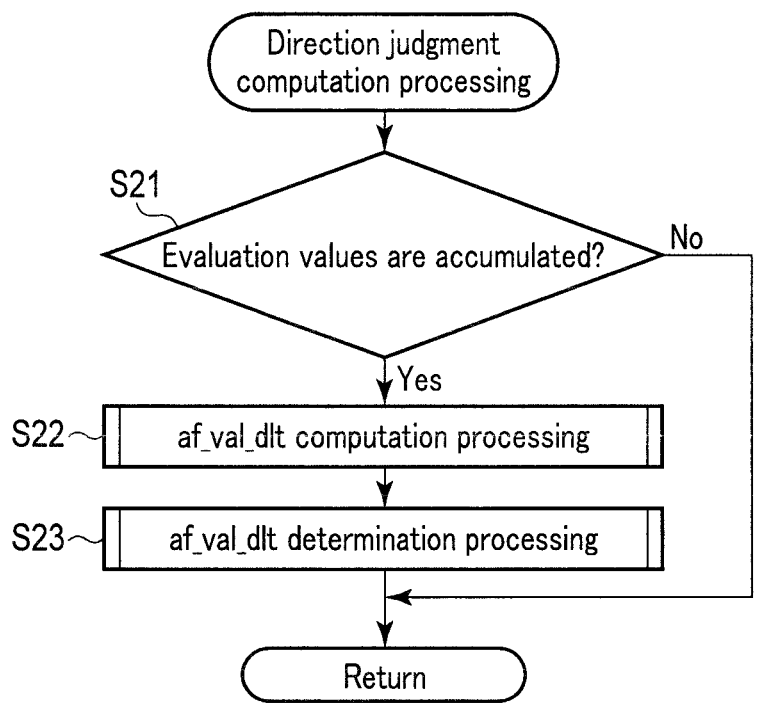
FIG. 7 is a flowchart showing direction judgment computation processing.

In step S12, the AF control circuit 1302 performs direction judgment computation processing. The direction judgment computation processing is described. FIG. 7 is a flowchart showing the direction judgment computation processing. In step S21, the AF control circuit 1302 determines whether the number of evaluation values necessary for the computation of the direction judgment is accumulated. By way of example, at least two frames of evaluation values are needed for the computation of the direction judgment in the case where the state is not the far-and-near mixing state. When it is determined in step S21 that the number of evaluation values necessary for the computation of the direction judgment is not accumulated, the processing in FIG. 7 then ends. When it is determined in step S21 that the number of evaluation values necessary for the computation of the direction judgment is accumulated, the processing shifts to step S22.

In step S22, the AF control circuit 1302 performs af_val_dlt computation processing. The processing then shifts to step S23. The af_val_dlt computation processing is processing to compute a difference between two frames of evaluation values Afval [n−1] and Afval[n] (n is a frame number), that is, Afval_dlt in (Equation 1) below.

$$Afval\_dlt = Afval[n] - Afval[n-1] \quad \text{(Equation 1)}$$

Figure 8:
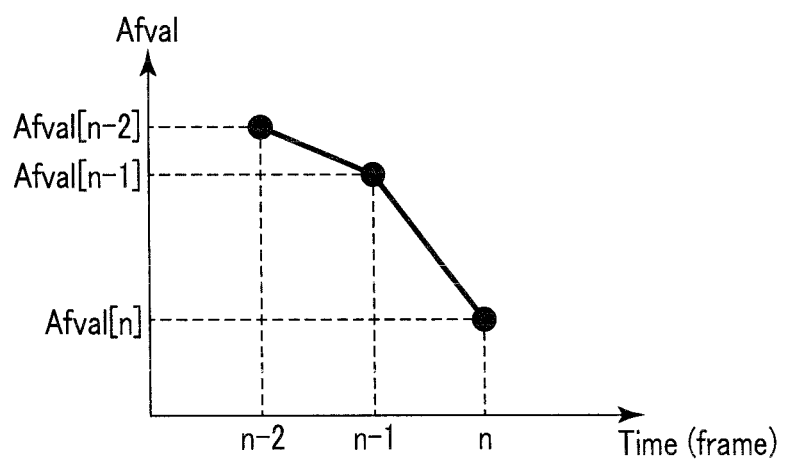
FIG. 8 is a graph showing the relation between the elapse of time (frame) and the change of an evaluation value in the case where the state is not a far-and-near mixing state.

FIG. 8 shows the relation between the elapse of time (frame) and the change of the evaluation value in the case where the state is not the far-and-near mixing state. In a normal contrast AF method in which later-described reverse drive is not performed, evaluation values are sequentially acquired while the focus lens is moved in the same direction. Thus, when the contrast of the subject is correctly acquired and when the focus lens is not in the vicinity of focus, the evaluation values monotonously increase or monotonously decrease in accordance with the elapse of time, that is, the change of the position of the focus lens, as shown in FIG. 8.

Figure 9:
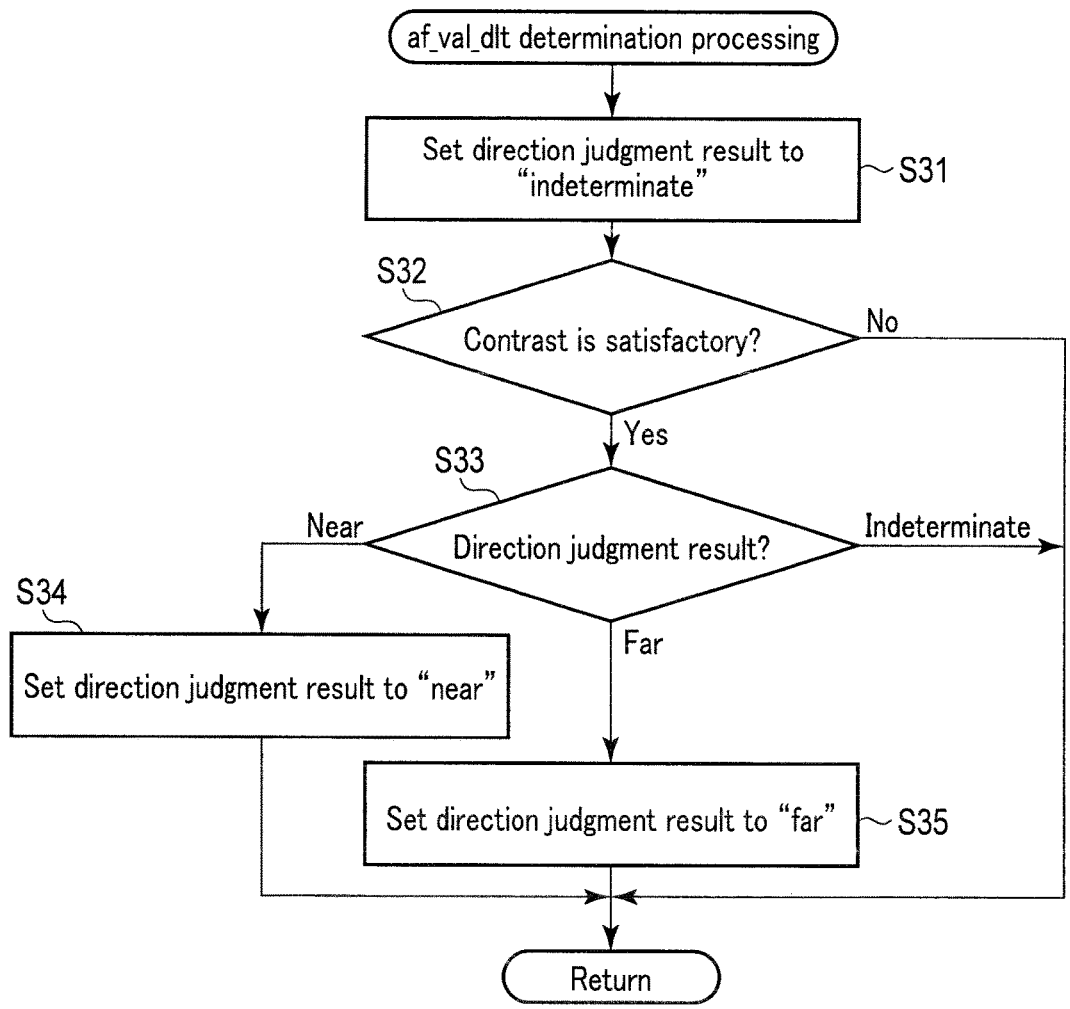
FIG. 9 is a flowchart showing af_val_dlt determination processing.

In step S23, the AF control circuit 1302 performs af_val_dlt determination processing. The processing in FIG. 7 then ends. The af_val_dlt determination processing is processing to judge the drive direction of the focus lens in the currently selected focus detection region. The af_val_dlt determination processing in step S23 is described. FIG. 9 is a flowchart showing the af_val_dlt determination processing.

In step S31, the AF control circuit 1302 initializes the direction judgment result for the currently selected evaluation value of the currently selected focus detection region to "indeterminate".

In step S32, the AF control circuit 1302 determines whether the contrast of the subject is satisfactory. For example, if the magnitude of the evaluation value is equal to or more than a threshold, it is determined that the contrast of the subject is satisfactory. When it is determined in step S32 that the contrast of the subject is not satisfactory, the processing in FIG. 9 ends, and the processing shifts to determination of the end of the loop processing for the HPF in FIG. 6. In this case, the direction judgment result remains "indeterminate". When it is determined in step S32 that the contrast of the subject is satisfactory, the processing shifts to step S33.

In step S33, the AF control circuit 1302 makes the direction judgment from the absolute value and sign of the difference Afval_dlt of the evaluation values. First, when the absolute value of the difference Afval_dlt of the evaluation values is out of a range exceeding a predetermined direction judgment reference value, the direction judgment is not determined. In this case, the direction judgment result remains "indeterminate". In contrast, when the absolute value of the difference Afval_dlt of the evaluation values is within the range exceeding the direction judgment reference value and when the sign of the difference Afval_dlt of the evaluation values is positive, the direction judgment result is the same direction as the drive direction of the focus lens immediately before the current af_val_dlt determination processing. That is, when the focus lens is driven from the far side to the near side, the direction judgment result is "far to near (far)". When the focus lens is driven from the near side to the far side, the direction judgment result is "near to far (near)". Moreover, when the absolute value of the difference Afval_dlt of the evaluation values is within a range fixed by the direction judgment reference value and when the sign of the difference Afval_dlt of the evaluation values is negative, the direction judgment result is opposite to the drive direction of the focus lens immediately before the current af_val_dlt determination processing. That is, when the focus lens is driven from the far side to the near side, the direction judgment result is "far". When the focus lens is driven from the near side to the far side, the direction judgment result is "near". When it is determined in step S33 that the direction judgment result is "indeterminate", the processing in FIG. 9 ends, and the processing shifts to the determination of the end of the loop processing for the HPF in FIG. 6. When it is determined in step S33 that the direction judgment result is "near", the processing shifts to step S34. When it is determined in step S33 that the direction judgment result is "far", the processing shifts to step S35.

In step S34, the AF control circuit 1302 sets the direction judgment result for the currently selected evaluation value of the currently selected focus detection region to "near". The processing in FIG. 9 then ends, and the processing shifts to the determination of the end of the loop processing for the HPF in FIG. 6. In step S35, the AF control circuit 1302 sets the direction judgment result for the currently selected evaluation value of the currently selected focus detection region to "far". The processing in FIG. 9 then ends, and the processing shifts to the determination of the end of the loop processing for the HPF in FIG. 6.

Figure 10:
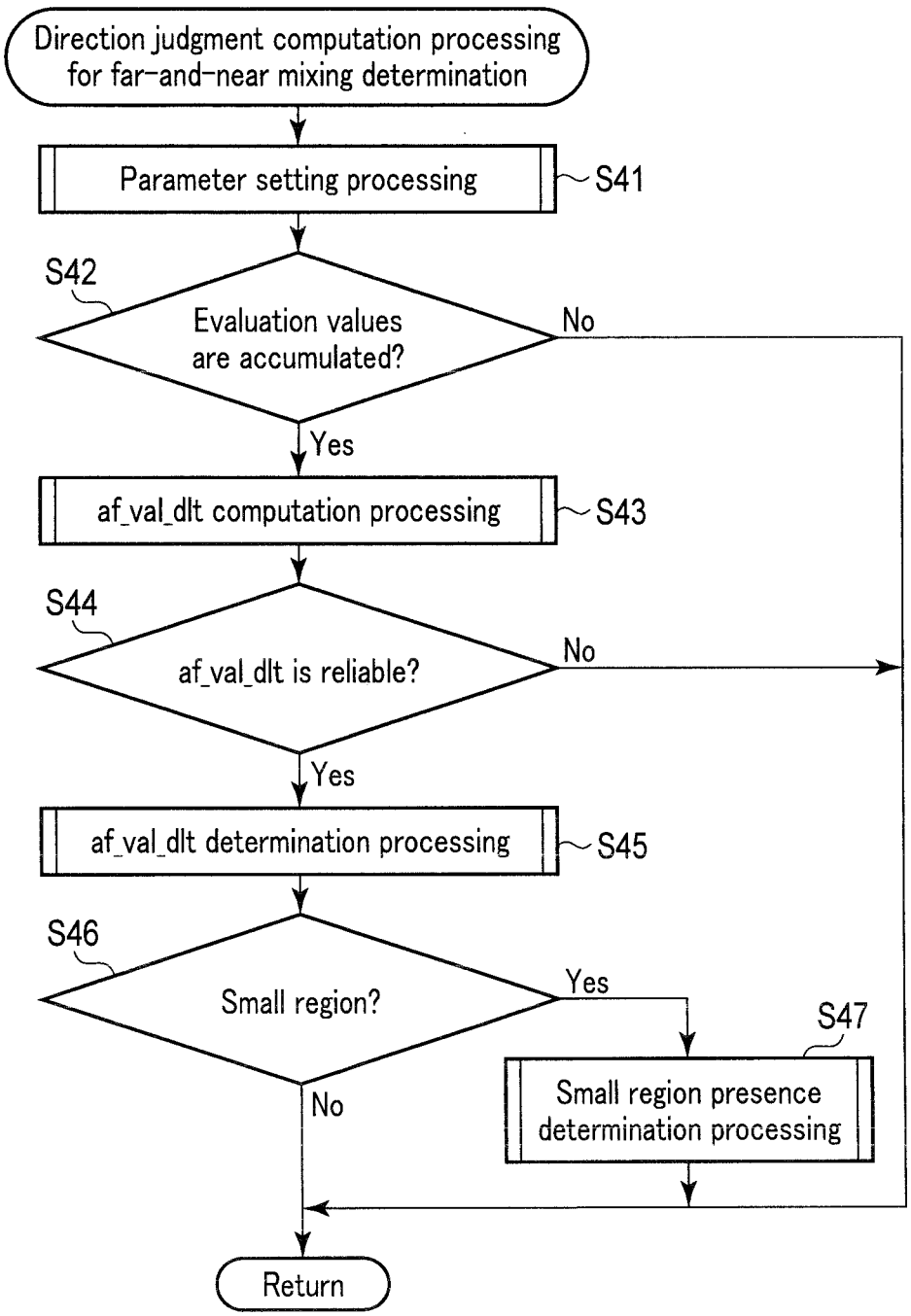
FIG. 10 is a flowchart showing direction judgment computation processing for far-and-near mixture determination.

Here, back to the explanation of FIG. 6, the AF control circuit 1302 performs direction judgment computation processing for far-and-near mixture determination in step S13 of FIG. 6. The judgment computation processing for far-and-near mixture determination is processing in the case where it is determined that the subject is suspected to be a far-and-near mixing subject. The direction judgment computation processing for far-and-near mixture determination is described. FIG. 10 is a flowchart showing the direction judgment computation processing for far-and-near mixture determination. In step S41, the AF control circuit 1302 performs parameter setting processing. As the parameter setting processing, the AF control circuit 1302 sets a parameter suited to the currently selected evaluation value of the currently selected focus detection region. This parameter is, for example, the direction judgment reference value. For example, because the evaluation values tend to be unstable in the small regions, the thresholds of the direction judgments in the small regions are set so that the direction judgments are more difficult to determine. This reduces the possibility of direction judgment errors in the small regions.

In step S42, the AF control circuit 1302 determines whether the number of evaluation values necessary for the computation of the direction judgment is accumulated. By way of example, at least three frames of evaluation values are needed for the computation of the direction judgment in the case where the state is the far-and-near mixing state. When it is determined in step S42 that the number of evaluation values necessary for the computation of the direction judgment is not accumulated, the processing in FIG. 10 then ends. When it is determined in step S42 that the number of evaluation values necessary for the computation of the direction judgment is accumulated, the processing shifts to step S43.

In step S43, the AF control circuit 1302 performs af_val_dlt computation processing. The processing then shifts to step S44. The computation in (Equation 2) below is performed in the af_val_dlt computation processing in step S43 which is performed in the case where the state is the far-and-near mixing state.

$$Afval\_dlt = Afval[n] - Afval[n-1] \times 2 + Afval[n-2] \quad \text{(Equation 2)}$$

FIG. 11 shows the relation between the elapse of time (frame) and the change of the evaluation value in the case where the state is the far-and-near mixing state. Although described later, the drive direction of the focus lens is switched in one of three frames. Thus, when the contrast of the subject is correctly acquired, the evaluation value increases or decreases in accordance with the elapse of time, that is, the change of the position of the focus lens, as shown in FIG. 11. Afval[n−1] is doubled in (Equation 2) so that the tendency of the increase and decrease of the evaluation value shown in FIG. 11 can be clearly judged. The evaluation value changes in the order of decrease and increase here in FIG. 11, but may change in the order of increase and decrease in some cases.

In step S44, the AF control circuit 1302 determines whether the difference Afval_dlt of the evaluation values is reliable. For example, it is determined that the difference Afval_dlt of the evaluation values is reliable when being a certain range exceeding the direction judgment reference value. When it is determined in step S44 that the difference Afval_dlt of the evaluation values is not reliable, the processing in FIG. 10 then ends. When it is determined in step S44 that the difference Afval_dlt of the evaluation values is reliable, the processing shifts to step S45.

In step S45, the AF control circuit 1302 performs the af_val_dlt determination processing. The processing then shifts to step S46. The af_val_dlt determination processing is performed in a manner similar to the af_val_dlt determination processing in step S23. Therefore, no explanation is provided.

In step S46, the AF control circuit 1302 determines whether the selected focus detection region is a small region. When it is determined in step S46 that the selected focus detection region is not a small region, the processing in FIG. 10 then ends. When it is determined in step S46 that the selected focus detection region is a small region, the processing shifts to step S47.

In step S47, the AF control circuit 1302 performs small region presence determination processing. The processing in FIG. 10 then ends. The small region presence determination processing is described. As described above, in the far-and-near mixing state, the evaluation value changes from increase to decrease or from decrease to increase in one of three frames when the contrast of the subject is correctly acquired in the small region. Therefore, when the evaluation values of three frames monotonously increase or monotonously decrease, the imaging device or the subject is unstable, and it can be judged that the contrast of the subject is not correctly acquired by the currently selected HPF in the currently selected small region. If such a direction judgment result is used, there is a possibility that a wrong subject may be in focus. Therefore, a direction judgment result in which the evaluation values of three frames monotonously increase or monotonously decrease is set to be "indeterminate" by the small region presence determination processing. Specifically, when one of the following two conditions is satisfied, the AF control circuit 1302 sets the direction judgment result by the currently selected HPF in the currently selected small region to be "indeterminate". In contrast, when neither of the following two conditions is satisfied, the AF control circuit 1302 does not change the direction judgment result by the currently selected HPF in the currently selected small region.

$$Afval[n] > Afval[n-1], \text{ and } Afval[n-1] > Afval[n-2] \quad (1)$$

$$Afval[n] < Afval[n-1], \text{ and } Afval[n-1] < Afval[n-2] \quad (2)$$

Here, back to the explanation of FIG. 6, the AF control circuit 1302 performs the determination of the end of the loop processing for each of the HPFs after the direction judgment computation processing in step S12 or the direction judgment computation processing for far-and-near mixture determination in step S13. That is, when it is determined that the processing in steps S11 to S13 is finished for the results of all the HPFs in the currently selected focus detection region, the loop processing for each of the HPFs ends. In this case, the processing shifts to step S14. In contrast, when it is determined that the processing in steps S11 to S13 is not finished for the results of all the HPFs in the currently selected focus detection region, the processing returns to step S11 after the switch of the HPFs.

In step S14, the AF control circuit 1302 performs direction judgment processing for the selected focus detection region. The processing then shifts to determination of the end of the loop processing for each of the focus detection regions. Overall direction judgment processing for the focus detection region is described. FIG. 12 is a flowchart showing direction judgment processing in the individual focus detection region. In step S51, the AF control circuit 1302 performs priority determination processing of the HPFs. The processing then shifts to the determination of the end of the loop processing for each of the focus detection regions.

The priority determination processing of the HPFs is performed, for example, in accordance with a table shown in FIG. 13. In FIG. 13, "O" indicates that the direction judgment is fixed by use of the result of the corresponding HPF. The "same" indicates that the direction judgment result is the same as the direction judgment results based on the results of the other HPFs.

In the example of FIG. 13, the AF control circuit 1302 first determines whether the direction judgment is fixed by use of the result of the HPF3. When the direction judgment is fixed by use of the result of the HPF3, the AF control circuit 1302 uses the direction judgment result by the HPF3.

When the direction judgment result by the HPF3 is not fixed, the AF control circuit 1302 determines whether the direction judgment result by the HPF2 is the same as the direction judgment result by the HPF1. When the direction judgment result by the HPF2 is the same as the direction judgment result by the HPF1, the AF control circuit 1302 uses the direction judgment result by the HPF2.

When the direction judgment result by the HPF2 is not the same as the direction judgment result by the HPF1, the AF control circuit 1302 determines whether the direction judgment is fixed by use of the result of the HPF2. When the direction judgment is fixed by use of the result of the HPF2, the AF control circuit 1302 uses the direction judgment result by the HPF2. When the direction judgment is not fixed by use of the result of the HPF2, the AF control circuit 1302 determines whether the direction judgment is fixed by use of the result of the HPF1. When the direction judgment is fixed by use of the result of the HPF1, the AF control circuit 1302 uses the direction judgment result by the HPF1.

Thus, in the example of FIG. 13, priority is set so that the direction judgment results based on the results of the HPFs higher in cut-off frequency are of higher importance. This is because the direction judgment results based on the results of the HPFs higher in cut-off frequency are more precise in the vicinity of focus where an obtained image includes more high-frequency components.

Here, back to the explanation of FIG. 6, the AF control circuit 1302 performs determination of the end of the loop processing for each of the focus detection regions after step S14. That is, when it is determined that the processing in steps S11 to S14 is finished for all the focus detection regions, the loop processing for each of the focus detection regions ends. In this case, the processing shifts to step S15. In contrast, when it is determined that the processing in steps S11 to S14 is not finished for all the focus detection regions, the processing returns to step S11 after the switch of the focus detection regions.

Figures 14, 15:
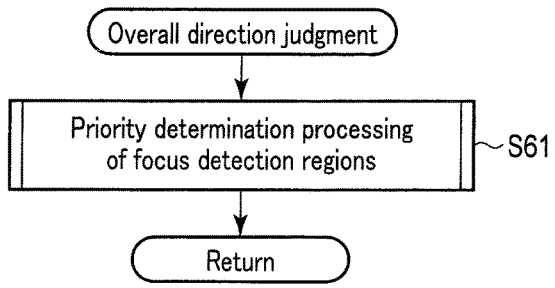
FIG. 14 is a flowchart showing overall direction judgment processing.
FIG. 15 is a diagram showing a table used in priority determination processing of the focus detection regions.

In step S15, the AF control circuit 1302 performs overall direction judgment processing for the focus detection region. Thus, the direction judgment processing ends. The processing then shifts to step S4 in FIG. 4. The overall direction judgment processing is described. FIG. 14 is a flowchart showing the overall direction judgment processing. In step S61, the AF control circuit 1302 performs priority determination processing of the focus detection regions. The processing in FIG. 14 then ends.

The priority determination processing of the focus detection regions is performed, for example, in accordance with a table shown in FIG. 15. In the table shown in FIG. 15, priority is set so that the results of "near" of the small regions closer to the center have priority. However, the direction judgment results regarding the small regions are considered only when all the following conditions are satisfied.

(1) Not tracking.
(2) Not detecting a face.
(3) Not conducting digital tele-conversion.
(4) Not conducting movie tele-conversion.
(5) Not acquiring the output of the gyro-sensor circuit 136.
(6) The current position of the focus lens is not located at a near position rather than the optically nearest position (which is only applied to the small regions for which the direction judgment results are "near").
(7) The focus state is determined to be "far-and-near mixing" in far-and-near mixture determination processing that will be described later.
(8) The subject is not a point light source.

In the example of FIG. 15, the AF control circuit 1302 first determines whether the direction judgment result regarding the small region (5) is "near". When the direction judgment result is "near", the AF control circuit 1302 decides that the overall direction judgment result is "near". When the direction judgment result regarding the small region (5) is not "near", the AF control circuit 1302 determines whether the direction judgment result regarding the small region (8) is "near". When the direction judgment result is "near", the AF control circuit 1302 decides that the overall direction judgment result is "near". When the direction judgment result regarding the small region (8) is not "near", the AF control circuit 1302 determines whether the direction judgment result regarding the small region (4) is "near". When the direction judgment result is "near", the AF control circuit 1302 decides that the overall direction judgment result is "near". Similarly, the AF control circuit 1302 determines whether the direction judgment results are "near" in the order of the small region (6), the small region (2), the small region (7) the small region (9), the small region (1), the small region (3), and the middle region. When the direction judgment results are "near", the AF control circuit 1302 decides that the overall direction judgment result is "near".

When the direction judgment result regarding the middle region is not "near", the AF control circuit 1302 determines whether the direction judgment result regarding the small region (5) is "far". When the direction judgment result is "far", the AF control circuit 1302 decides that the overall direction judgment result is "far". When the direction judgment result regarding the small region (5) is not "far", the AF control circuit 1302 determines whether the direction judgment result regarding the small region (8) is "far". When the direction judgment result is "far", the AF control circuit 1302 decides that the overall direction judgment result is "far". When the direction judgment result regarding the small region (8) is not "far", the AF control circuit 1302 determines whether the direction judgment result regarding the small region (4) is "far". When the direction judgment result is "far", the AF control circuit 1302 decides that the overall direction judgment result is "far". Similarly, the AF control circuit 1302 determines whether the direction judgment results are "far" in the order of the small region (6), the small region (2), the small region (7), the small region (9), the small region (1), the small region (3), and the middle region. When the direction judgment results are "far", the AF control circuit 1302 decides that the overall direction judgment result is "far".

When the direction judgment result regarding the middle region is not "far", the AF control circuit 1302 determines whether the direction judgment result regarding the large region is "near". When the direction judgment result is "near", the AF control circuit 1302 decides that the overall direction judgment result is "near". When the direction judgment result is not "near", the AF control circuit 1302 determines whether the direction judgment result regarding the large region is "far". When the direction judgment result is "far", the AF control circuit 1302 decides that the overall direction judgment result is "far". When the direction judgment result is not "far", the AF control circuit 1302 decides that the overall direction judgment result is "indeterminate".

Thus, in the example of FIG. 15, the small regions, the middle region, and the large region are set in descending order of priority. This is because the small regions can reduce the influence of the far-and-near mixing subject. The small regions closer to the center are of higher priority, and the priority is set higher on the lower side than on the upper side. One reason is that composition is often decided so that the subject of interest is located in the center and that the subject of interest is often present on the lower side of the image rather than on the upper side. Another reason is that the near subject is often present on the lower side of the image rather than on the upper side.

Figure 16:
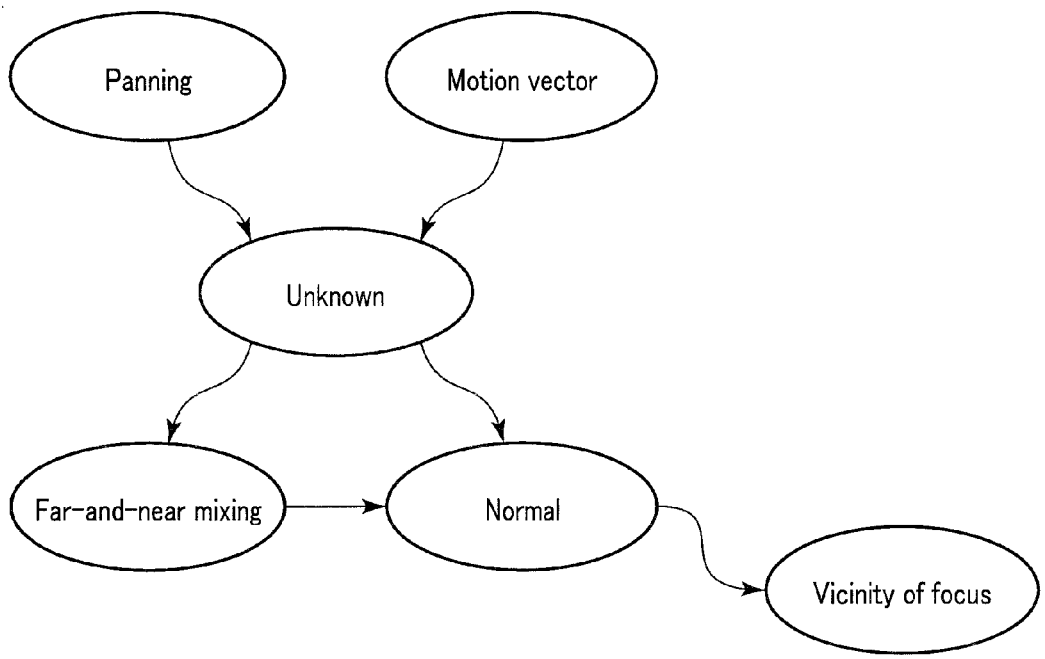
FIG. 16 is a state transition diagram of a focus state.

Next, the focus state update processing is described. In the moving image AF, there are changes that can affect focus adjustment such as an operation to move the imaging device 100 by the user, known as panning or tilting. Even if the imaging device 100 is not moving, there are changes in the subject state that can affect focus adjustment, such as a change in the contrast of the subject or the movement of the subject. In the focus state update processing, the current focus state is updated to one of the states in the state transition diagram of FIG. 16 from the change in the state of the imaging device 100 and the change in the subject state. In the example of FIG. 16, the focus state includes one of "panning", "motion vector", "normal", "far-and-near mixing", "unknown", and "vicinity of focus". "Panning" is a state where panning movement of the imaging device 100 (a user operation to move the imaging device 100 in a direction parallel to the surface of the earth at a substantially constant velocity) or tilting movement (a user operation to move the imaging device 100 in a direction vertical to the surface of the earth at a substantially constant velocity) is detected by the output of the gyro-sensor circuit 136. "Motion vector" is a state where the movement of the subject is detected from the change of the motion vector. "Normal" is a state where the subject is determined to be a normal subject which is not a far-and-near mixing subject. "Far-and-near mixing" is a state where the subject is determined to be a far-and-near mixing subject. "Unknown" is a state where it is not determined whether the subject is a far-and-near mixing subject or a normal subject. "Vicinity of focus" is a state where the position of the focus lens is determined to be in the vicinity of focus. As shown in FIG. 16, when the focus state is "panning" or "motion vector", the focus state maintains the original state or can make the transition to "unknown". When the focus state is "unknown", the focus state maintains the original state or can make the transition to "far-and-near mixing" or "normal". When the focus state is "far-and-near mixing", the focus state maintains the original state or can make the transition to "normal". When the focus state is "normal", the focus state maintains the original state or can make the transition to "vicinity of focus". When the changes of the evaluation values are great in all the focus states, the focus states can make the transition to "unknown".

Figure 17:
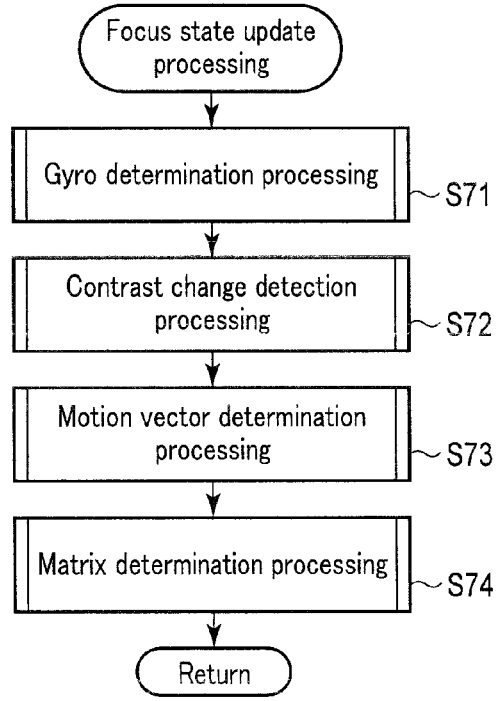
FIG. 17 is a flowchart showing focus state update processing.

FIG. 17 is a flowchart showing the focus state update processing. In step S71, the AF control circuit 1302 performs gyro determination processing. The gyro determination processing is processing of the highest priority in the focus state update processing. In the gyro determination processing, the AF control circuit 1302 determines whether the imaging device 100 is making a panning movement or a tilting movement from the output of the gyro-sensor circuit 136. For example, when a movement at a substantially constant velocity in a panning direction (a direction parallel to the surface of the earth) is detected from the output of the gyro-sensor circuit 136 which detects a movement in the panning direction, it is determined that the imaging device 100 is making a panning movement. When a movement at a substantially constant velocity in a tilting direction (a direction vertical to the surface of the earth) is detected from the output of the gyro-sensor circuit 136 which detects a movement in the tilting direction, it is determined that the imaging device 100 is making a tilting movement. When it is determined that the imaging device 100 is making the panning movement or the tilting movement, the AF control circuit 1302 causes the focus state to make the transition to "panning". The processing in FIG. 17 then ends. When it is determined that the imaging device 100 is making neither the panning movement nor the tilting movement, the AF control circuit 1302 determines whether the current focus state is "panning". When it is determined that the current focus state is "panning", the AF control circuit 1302 causes the focus state to make the transition to "unknown". The processing in FIG. 17 then ends. When it is determined that the current focus state is not "panning", the processing shifts to step S72.

Figures 18, 19:
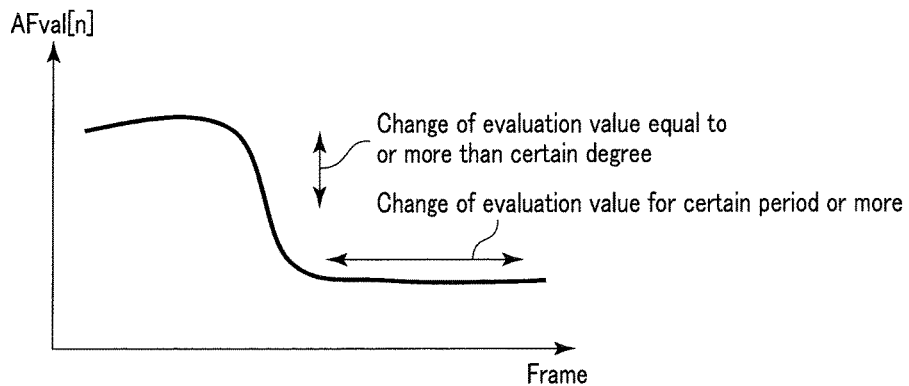
FIG. 18 is a graph illustrating contrast change detection processing.
FIG. 19 is a diagram showing a table that associates current focus states, the contents of determination, and transition destinations of focus states.

In step S72, the AF control circuit 1302 performs contrast change detection processing. The contrast change detection processing is processing to detect the change of the evaluation value which does not depend on the step drive. Here, the change of the evaluation value of the large region is determined in the contrast change detection processing. In the contrast change detection processing, as shown in FIG. 18, it is determined whether the evaluation value Afval[n] which is a value indicating contrast continues to decrease a certain value or more for a certain period. When it is determined that the decrease equal to or more than the certain value of the evaluation value Afval[n] continues for the certain period, the AF control circuit 1302 causes the focus state to make the transition to "unknown". The processing in FIG. 17 then ends. When it is determined that the evaluation value Afval[n] does not decrease a certain value or more or the decrease of the evaluation value Afval[n] does not continue for the certain period, the processing shifts to step S73. The decrease of the evaluation value Afval[n] is only used for determination so that it will not be determined that the evaluation value Afval[n] changes due to the increase of the evaluation value Afval[n] resulting from the driving of the focus lens.

In step S73, the AF control circuit 1302 performs motion vector determination processing. In the motion vector determination processing, the AF control circuit 1302 determines whether a motion vector more than a certain magnitude is detected from more than one frame of image data. When it is determined that a motion vector more than the certain magnitude is detected, the AF control circuit 1302 causes the focus state to make the transition to "motion vector". The processing in FIG. 17 then ends. When it is determined that a motion vector more than the certain magnitude is not detected, the processing shifts to step S74.

In step S74, the AF control circuit 1302 performs matrix determination processing. In the matrix determination processing, different determinations are made depending on the current focus state. The focus state is updated in accordance with the result of this determination. FIG. 19 is a diagram showing a table that associates a current focus states, the contents of determination, and transition destinations of the focus states. In the example of FIG. 19, when the current focus state is "normal", focus vicinity determination processing is performed. In the focus vicinity determination processing, the focus state can make the transition to "focus vicinity". When the current focus state is "far-and-near mixing", normal subject determination processing is performed. In the normal subject determination processing, the focus state can make the transition to "normal". When the current focus state is "unknown", far-and-near mixture determination processing is performed. In the far-and-near mixture determination processing, the focus state can make the transition to "far-and-near mixing" or "normal".

The focus vicinity determination processing is described. The focus vicinity determination processing is processing to determine whether the focus lens is close to the focus position from the history of the drive direction in the step phase and the change of the evaluation value. In the focus vicinity determination processing, whether all the following four conditions are satisfied is determined.

(1) A certain number of step drives or more in the same drive direction are performed.
(2) The change of the evaluation value from the direction judgment reference value of the target focus detection region is equal to or more than a threshold.
(3) The current result of the HPF1 of the target focus detection region is equal to or more than a threshold.
(4) The result of the HPF3 is used as the direction judgment result of the target focus detection region.

In the focus vicinity determination processing, the AF control circuit 1302 causes the focus state to make the transition to "focus vicinity" when it is determined that all the conditions (1) to (4) are satisfied. The processing in FIG. 17 then ends. FIG. 20 shows an example of the lens position and the state of the evaluation value when the conditions (1) to (4) are satisfied. The horizontal axes in the graphs of FIG. 20 indicate the frame number. The vertical axis in the upper graph of FIG. 20 indicates a lens position LDP, and the vertical axis in the lower graph indicates the evaluation value Afval[n].

In the focus vicinity determination processing, the AF control circuit 1302 leaves the focus state "normal" when determining that all the conditions (1) to (4) are not satisfied. The processing in FIG. 17 then ends.

The normal subject determination processing is described. The normal subject determination processing is processing to determine whether the subject is a normal subject or a far-and-near mixing subject. In the normal subject determination processing, it is determined that the subject is a normal subject when the frames in which the direction judgment results of the middle region and the small regions are the same come in succession.

As specific processing, whenever performing the normal subject determination processing, the AF control circuit 1302 determines whether the overall direction judgment result of the current focus detection region is the same as the direction judgment result of the middle region. As obvious from FIG. 15, the direction judgment results of the small regions are considered more important than the direction judgment result of the middle region in the direction judgment processing. Therefore, if the overall direction judgment result of the current focus detection region is the same as the direction judgment result of the middle region, it can be considered that the direction judgment results of the middle region and the small regions are the same.

When it is determined that the overall direction judgment result of the current focus detection region is the same as the direction judgment result of the middle region, the AF control circuit 1302 counts up a count value general_sbj_cnt. The count value general_sbj_cnt is a count value that indicates the number of successive frames in which the direction judgment results of the middle region and the small regions are the same. The count value general_sbj_cnt is updated, for example, at the start of the step phase or at the time of the update of the focus state. After counting up the count value general_sbj_cnt, the AF control circuit 1302 determines whether the count value general_sbj_cnt is equal to or more than a threshold. When determining that the count value general_sbj_cnt is equal to or more than the threshold, the AF control circuit 1302 causes the focus state to make the transition to "normal". When the AF control circuit 1302 does not count up the count value general_sbj_cnt or when the AF control circuit 1302 determines that the count value general_sbj_cnt is less than the threshold, the AF control circuit 1302 leaves the focus state "far-and-near mixing". The processing in FIG. 17 then ends.

Figure 21:
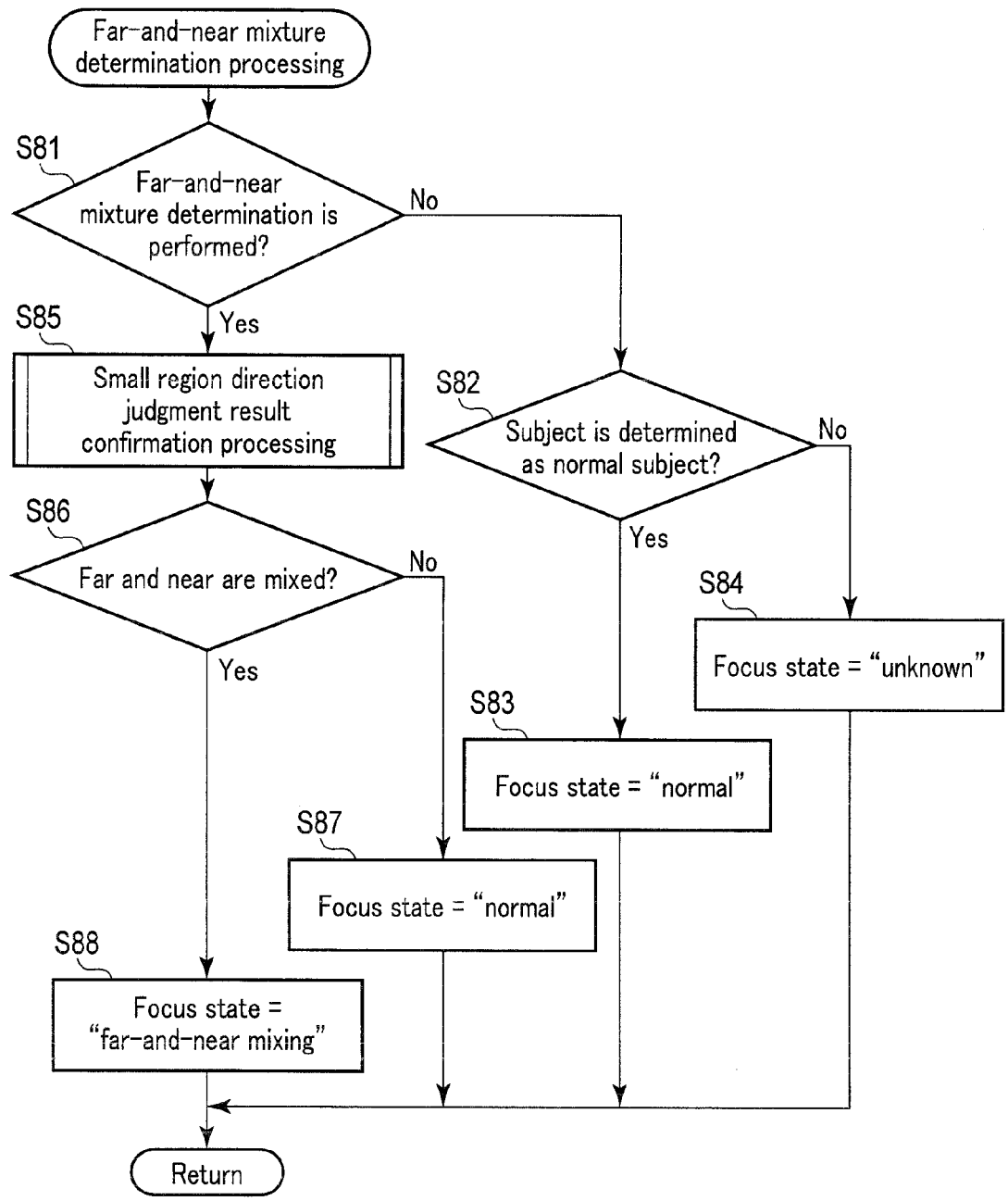
FIG. 21 is a flowchart showing far-and-near mixture determination processing.

The far-and-near mixture determination processing is described. The far-and-near mixture determination processing is processing to determine whether the subject is a normal subject or a far-and-near mixing subject when the focus state is "unknown". FIG. 21 is a flowchart showing the far-and-near mixture determination processing. In step S81, the AF control circuit 1302 determines whether to perform the far-and-near mixture determination processing. When all the following conditions are satisfied, it is determined that the far-and-near mixture determination processing is to be performed.

(1) An image magnification variation resulting from the driving of the focus lens is not great.
(2) The diaphragm 106 is not stopped down.
(3) The depth of field is not great.
(4) An image plane distance from the infinity end to the nearest end of the focus lens is not long as compared with a unit-defocus image-plane movement amount (an amount of movement of an image on the image plane when the focus lens moves a unit distance).

(5) The state of the search phase that will be described later is "far-and-near mixture determination".

When it is determined in step S81 that the far-and-near mixture determination processing is not to be performed, the processing shifts to step S82. When it is determined in step S81 that the far-and-near mixture determination processing is to be performed, the processing shifts to step S85.

In step S82, the AF control circuit 1302 determines whether to determine that the subject is determined to be a normal subject. In step S82, it is determined that the subject is determined to be a normal subject when the state of the search phase that will be described later is "normal subject determination". When it is determined in step S82 that the subject is determined to be a normal subject, the processing shifts to step S83. When it is determined in step S82 that the subject is not determined to be a normal subject, the processing shifts to step S84.

In step S83, the AF control circuit 1302 causes the focus state to make the transition to "normal". The processing in FIG. 21 then ends. In this instance, the processing in FIG. 17 also ends. In step S84, the AF control circuit 1302 causes the focus state to make the transition to "unknown". The processing in FIG. 21 then ends. In this instance, the processing in FIG. 17 also ends.

Figure 22:
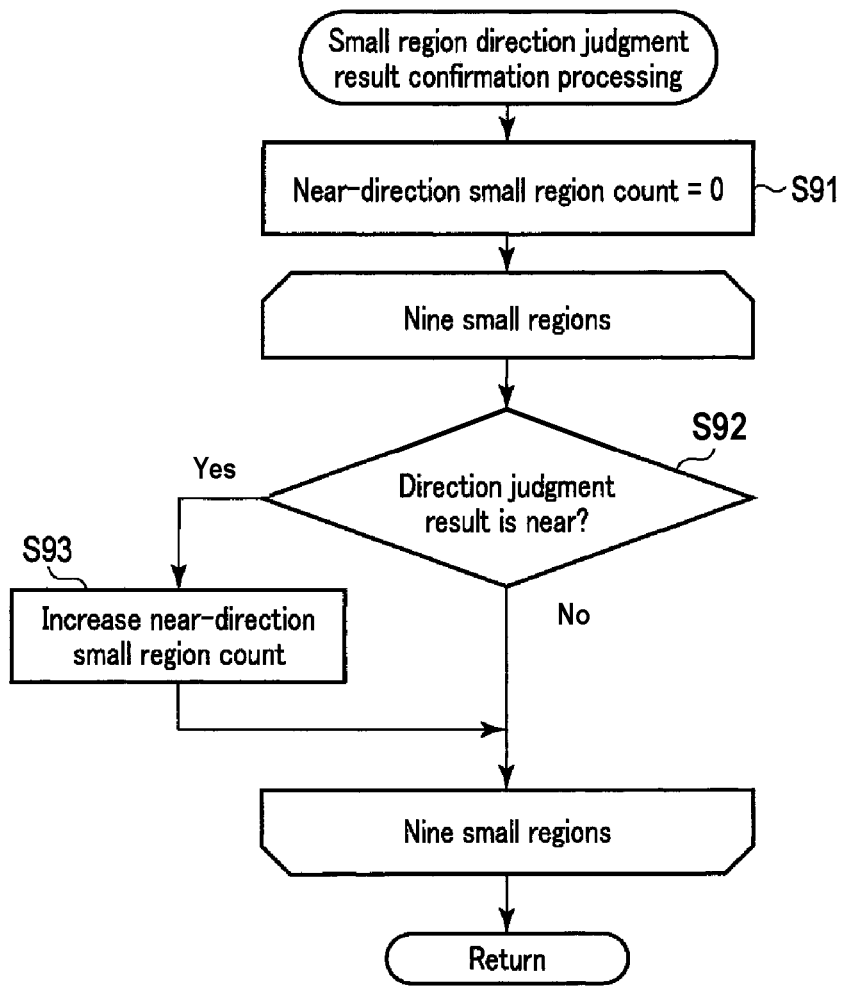
FIG. 22 is a flowchart showing small region direction judgment result confirmation processing.

In step S85, the AF control circuit 1302 performs small region direction judgment result confirmation processing. FIG. 22 is a flowchart showing the small region direction judgment result confirmation processing. In step S91, the AF control circuit 1302 initializes a near-direction small region count to 0. The near-direction small region count is a count value which indicates the number of small regions in which the direction judgment results are "near".

The AF control circuit 1302 then selects the small regions for which the loop processing is to be performed, for example, from the upper right small region to the lower left small region. The small regions may be selected in different orders.

In step S92, the AF control circuit 1302 determines whether the currently selected direction judgment result is "near". When it is determined in step S92 that the direction judgment result is "near", the processing shifts to step S93. When it is determined in step S92 that the direction judgment result is not "near", the processing shifts to determination of the end of the loop processing for the small regions.

In step S93, the AF control circuit 1302 increases the near-direction small region count by one. The processing then shifts to determination of the end of the loop processing for the small regions.

After step S92 or S93, the AF control circuit 1302 performs determination of the end of the loop processing for each of the small regions. That is, when it is determined that the processing in steps S92 to S93 is finished for all the small regions, the loop processing for each of the small regions ends. The processing in FIG. 22 then ends.

Here, back to the explanation of FIG. 6, the AF control circuit 1302 determines in step S86 whether the current subject is in the far-and-near mixing state. For example, when the value of the near-direction small region count is higher than a threshold (e.g. the majority), it is determined that the current subject is in the far-and-near mixing state. If there are a large number of small regions in which the direction judgment results are "near", it can be considered that more than one subject are mixed when seen in the middle region or the large region. When it is determined in step S86 that the current subject is not in the far-and-near mixing state, the processing shifts to step S87. When it is determined in step S86 that the current subject is in the far-and-near mixing state, the processing shifts to step S88.

In step S87, the AF control circuit 1302 causes the focus state to make the transition to "normal". The processing in FIG. 21 then ends. In this instance, the processing in FIG. 17 also ends. In step S88, the AF control circuit 1302 causes the focus state to make the transition to "far-and-near mixing". The processing in FIG. 21 then ends. In this instance, the processing in FIG. 17 also ends.

Figures 23, 24:
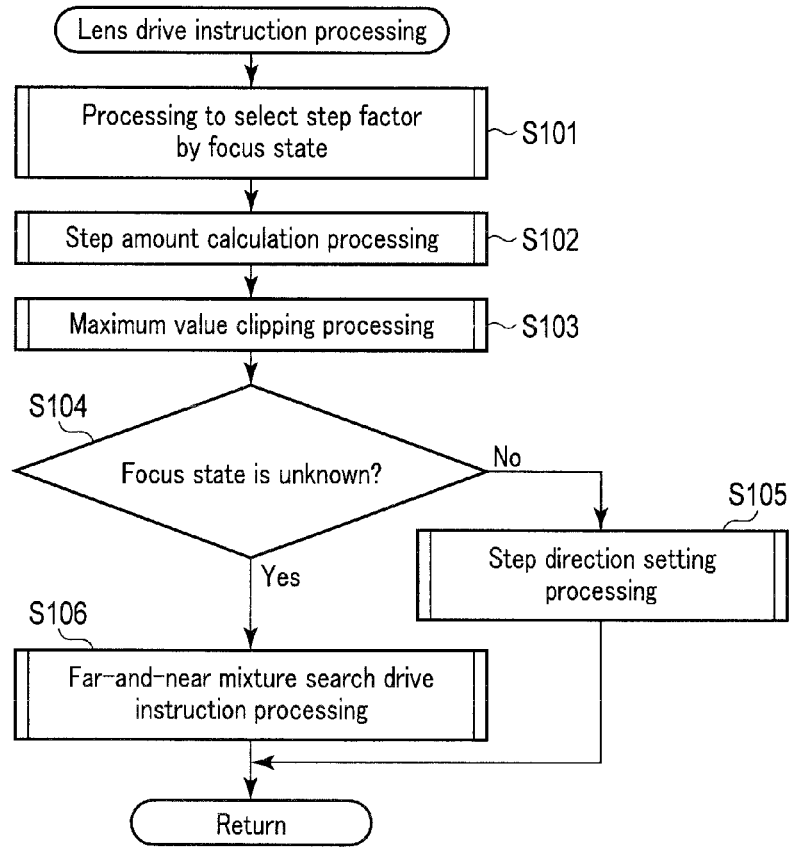
FIG. 23 is a flowchart showing lens drive instruction processing.
FIG. 24 is a diagram showing a table that shows the correspondence between the focus states and step factors.

Next, the lens drive processing is described. FIG. 23 is a flowchart showing lens drive instruction processing. In step S101, the AF control circuit 1302 performs processing to select a step factor by the focus state. In the step factor selection processing, a step factor to decide a step amount at the time of lens driving is selected by the focus state. FIG. 24 is a diagram showing a table that shows the correspondence between the focus states and the step factors. As shown in FIG. 24, the step factor is represented as a defocus amount and an image magnification variation amount. The defocus amount and the image magnification variation amount are amounts related to the appearance of a live-view at the time of lens driving. Therefore, it is possible to achieve both tracking performance of AF and the appearance of the live-view by deciding the step amount on the basis of the defocus amount or the image magnification variation amount.

In FIG. 24, the defocus amount in the case where the focus state is "normal" can be set to values ranging from 1Fδ to 4Fδ (F: F number, δ: the diameter of a permissible circle of confusion) which are values higher than in other focus states. The image magnification variation amount in the case where the focus state is "normal" is set to a value higher than in other focus states. When the focus state is "normal", there is a possibility that the image may not be in the vicinity of focus and may be blurred, so that the appearance of the live-view does not deteriorate even if the step amount is increased to some degree. Therefore, the defocus amount and the image magnification variation amount that are selected are set to values higher than the amounts in other focus states. This improves the tracking performance of AF.

Meanwhile, when the focus state is "focus vicinity", "panning", and "far-and-near mixing", smaller step amounts are set because focus precision is considered important. When the focus state is "unknown", the lens is driven with a fixed step amount.

In step S102, the AF control circuit 1302 performs step amount calculation processing. The defocus amount and the image magnification variation amount that are selected in step S101 are respectively converted into step amounts in the step amount calculation processing. The step amounts are represented as, for example, the number of pulses with which the focus adjustment mechanism 104 drives the focus lens. The step amounts are calculated, for example, on the basis of a conversion formula to find a step amount from a defocus amount and a conversion formula to find a step amount from the image magnification variation amount prestored in the AF control circuit 1302. After calculating the step amounts, the AF control circuit 1302 uses a smaller one of the two step amounts as a final step amount.

In step S103, the AF control circuit 1302 performs maximum value clipping processing. For example, the step amount is calculated as a multiplication of a parameter such as the defocus amount prestored in the AF control circuit 1302 by the step factor. Thus, there is a possibility that a step amount to be calculated may be greater than a maximum step amount that can be set in the focus adjustment mechanism 104. Therefore, in the maximum value clipping processing, when a calculated step amount is greater than the maximum value that can be set in the focus adjustment mechanism 104, the calculated step amount is clipped at the maximum value.

In step S104, the AF control circuit 1302 determines whether the focus state is "unknown". When it is determined in step S104 that the focus state is not "unknown", the processing shifts to step S105. When it is determined in step S104 that the focus state is "unknown", the processing shifts to step S106.

Figure 25:
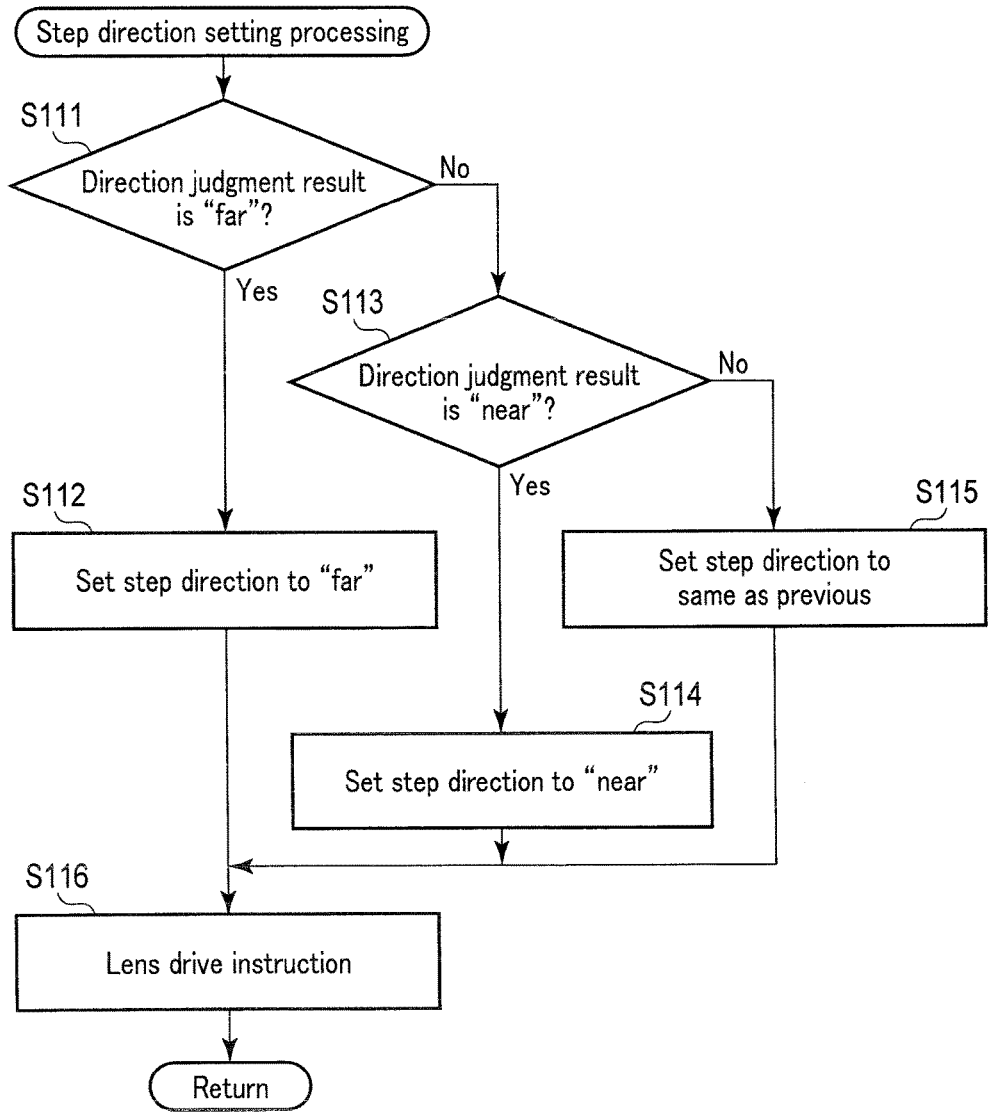
FIG. 25 is a flowchart showing step direction setting processing.

In step S105, the AF control circuit 1302 performs step direction setting processing. The processing in FIG. 23 then ends. The step direction setting processing is described. FIG. 25 is a flowchart showing the step direction setting processing. In step S111, the AF control circuit 1302 determines whether the overall direction judgment result of the focus detection region is "far". When it is determined in step S111 that the direction judgment result is "far", the processing shifts to step S112. When it is determined in step S111 that the direction judgment result is not "far", the processing shifts to step S113.

In step S112, the AF control circuit 1302 issues an instruction to the focus adjustment mechanism 104 to set the step direction to "far". The processing then shifts to step S116.

In step S113, the AF control circuit 1302 determines whether the overall direction judgment result of the focus detection region is "near". When it is determined in step S111 that the direction judgment result is "near", the processing shifts to step S114. When it is determined in step S113 that the direction judgment result is not "near", the processing shifts to step S115.

In step S114, the AF control circuit 1302 sets the step direction to "near". The processing then shifts to step S116.

In step S115, the AF control circuit 1302 sets the step direction to the same direction as the direction set in the previous step direction setting processing. The processing then shifts to step S116. The processing in step S115 is processing in the case where the overall direction judgment result of the focus detection region is "indeterminate".

In step S116, the AF control circuit 1302 issues a lens drive instruction including the step amount and the step direction to the focus adjustment mechanism 104. The processing in FIG. 25 then ends. The focus adjustment mechanism 104 drives the focus lens in response to the instruction from the AF control circuit 1302.

Here, back to the explanation of FIG. 23, the AF control circuit 1302 performs far-and-near mixture search drive instruction processing in step S106. The far-and-near mixture search drive instruction processing is described. The far-and-near mixture search drive instruction processing is processing performed during the search phase in which the focus state is "unknown". FIG. 26 is a state transition diagram of the search phase. In the search phase, the state makes the transition between "initial", "forward drive", "waiting for reverse drive", "normal subject determination", and "far-and-near mixture determination". The state makes the transition to "initial" in the initial far-and-near mixture search drive instruction processing, that is, in the far-and-near mixture search drive instruction processing immediately after the change of the focus state to "unknown". In "initial", the lens is driven in accordance with the overall direction judgment result of the current focus detection region. From "initial", the state can make the transition to "forward drive". In "forward drive", the lens is driven in accordance with the result of the previous lens driving. From "forward drive", the state can make the transition to "waiting for reverse drive" or "normal subject determination". In "waiting for reverse drive", whether to perform switch drive once in three frames is determined. From "waiting for reverse drive", the state can make the transition to "normal subject determination" or "far-and-near mixture determination". If the state is "far-and-near mixture determination", the aforementioned far-and-near mixture determination processing is performed. If the state is "normal subject determination", the focus state makes the transition to "normal" in step S83 of the aforementioned far-and-near mixture determination processing.

Figure 27:
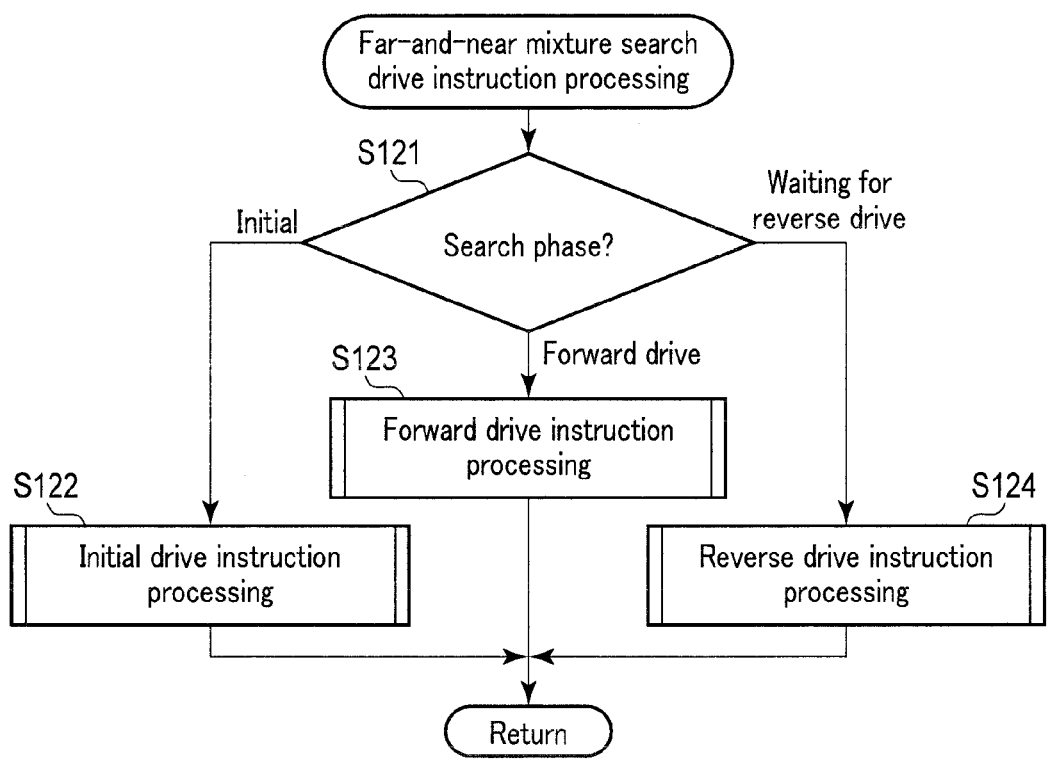
FIG. 27 is a flowchart showing far-and-near mixture search drive instruction processing.

FIG. 27 is a flowchart showing the far-and-near mixture search drive instruction processing. In step S121, the AF control circuit 1302 determines whether the current state is "initial", "forward drive", or "waiting for reverse drive". When it is determined in step S121 that the current state is "initial", the processing shifts to step S122. When it is determined in step S121 that the current state is "forward drive", the processing shifts to step S123. When it is determined in step S121 that the current state is "waiting for reverse drive", the processing shifts to step S124.

Figure 28:
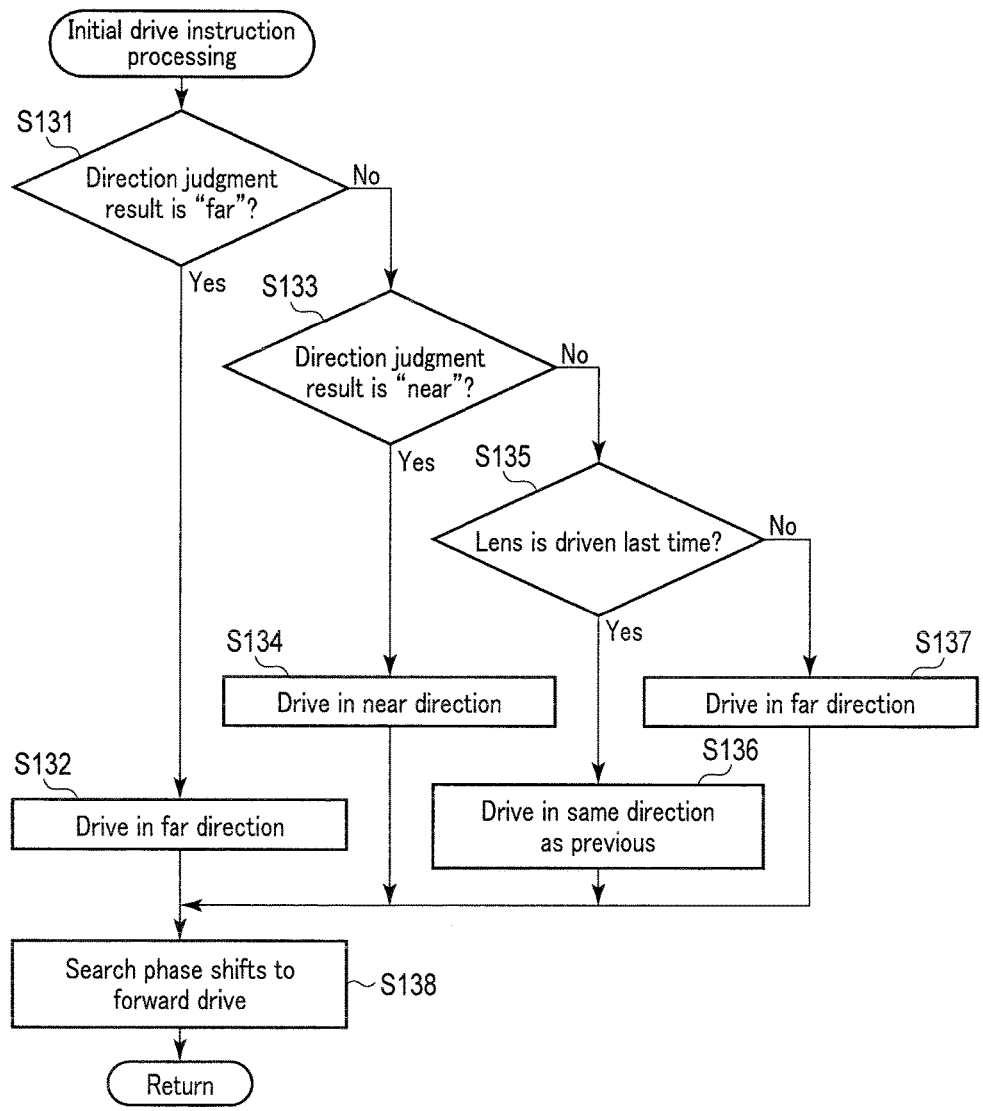
FIG. 28 is a flowchart showing initial drive instruction processing.

In step S122, the AF control circuit 1302 performs initial drive instruction processing. The processing in FIG. 27 then ends. The initial drive instruction processing is described. FIG. 28 is a flowchart showing the initial drive instruction processing. In step S131, the AF control circuit 1302 determines whether the overall direction judgment result of the focus detection region is "far". Here, the far-and-near mixture search drive instruction processing is processing performed when the focus state is "unknown". As described above, when the focus state is "unknown" in the direction judgment processing, the direction judgment result in the small region is not used as the overall direction judgment result of the focus detection region. Therefore, the direction judgment result made in the initial drive instruction processing is based on the direction judgment result of the middle region or the large region. The direction judgment result of the small region is subject to the state of the imaging device 100 and the change in the subject state. Therefore, the direction judgment result of the small region is not used during lens driving in which the focus state having the possibility of the state change of the imaging device 100 and the change in the subject state is "unknown". When it is determined in step S131 that the direction judgment result is "far", the processing shifts to step S132. When it is determined in step S131 that the direction judgment result is not "far", the processing shifts to step S133.

In step S132, the AF control circuit 1302 issues a lens drive instruction to the focus adjustment mechanism 104 to drive the focus lens in a "far" direction. The processing then shifts to step S138. The focus adjustment mechanism 104 drives the focus lens in the "far" direction in response to the instruction from the AF control circuit 1302. The step amount in this instance is set by the defocus amount. For example, the step amount is a step amount corresponding to $0.7F\delta$.

In step S133, the AF control circuit 1302 determines whether the overall direction judgment result of the focus detection region is "near". When it is determined in step S133 that the direction judgment result is "near", the processing shifts to step S134. When it is determined in step S133 that the direction judgment result is not "near", the processing shifts to step S135.

In step S134, the AF control circuit 1302 issues a lens drive instruction to the focus adjustment mechanism 104 to drive the focus lens in a "near" direction. The processing then shifts to step S138. The focus adjustment mechanism 104 then drives the focus lens in the "near" direction in response to the instruction from the AF control circuit 1302. The step amount in this instance is set by the defocus amount as in the case where the direction judgment result is "far".

In step S135, the AF control circuit 1302 determines whether the lens is driven last time, that is, whether the current initial drive instruction processing is the initial second or subsequent drive instruction processing after the start of the moving image AF. When it is determined in step S135 that the lens is driven last time, the processing shifts to step S136. When it is determined in step S135 that the lens is not driven last time, the processing shifts to step S137.

In step S136, the AF control circuit 1302 issues a lens drive instruction to the focus adjustment mechanism 104 to drive the focus lens in the same direction as the previous drive direction. That is, the AF control circuit 1302 issues a lens drive instruction to drive the focus lens in the "far" direction when the previous drive direction is the "far" direction, whereas the AF control circuit 1302 issues a lens drive instruction to drive the focus lens in the "near" direction when the previous drive direction is the "near" direction. The processing then shifts to step S138. The focus adjustment mechanism 104 drives the focus lens in response to the instruction from the AF control circuit 1302. The step amount in this instance is set by the defocus amount as in the case where the direction judgment result is "near".

In step S137, the AF control circuit 1302 issues a lens drive instruction to the focus adjustment mechanism 104 to drive the focus lens in the "far" direction. The processing then shifts to step S138. Because the direction judgment result is "indeterminate", the focus lens is driven in the "far" direction as a direction set for the time being. In step S137, the focus lens may be driven in the "near" direction.

In step S138, the AF control circuit 1302 causes the state of the search phase to make the transition to "forward drive". The processing in FIG. 28 then ends. Consequently, the processing branches to step S123 in the next determination in step S121 in FIG. 27.

Figure 29:
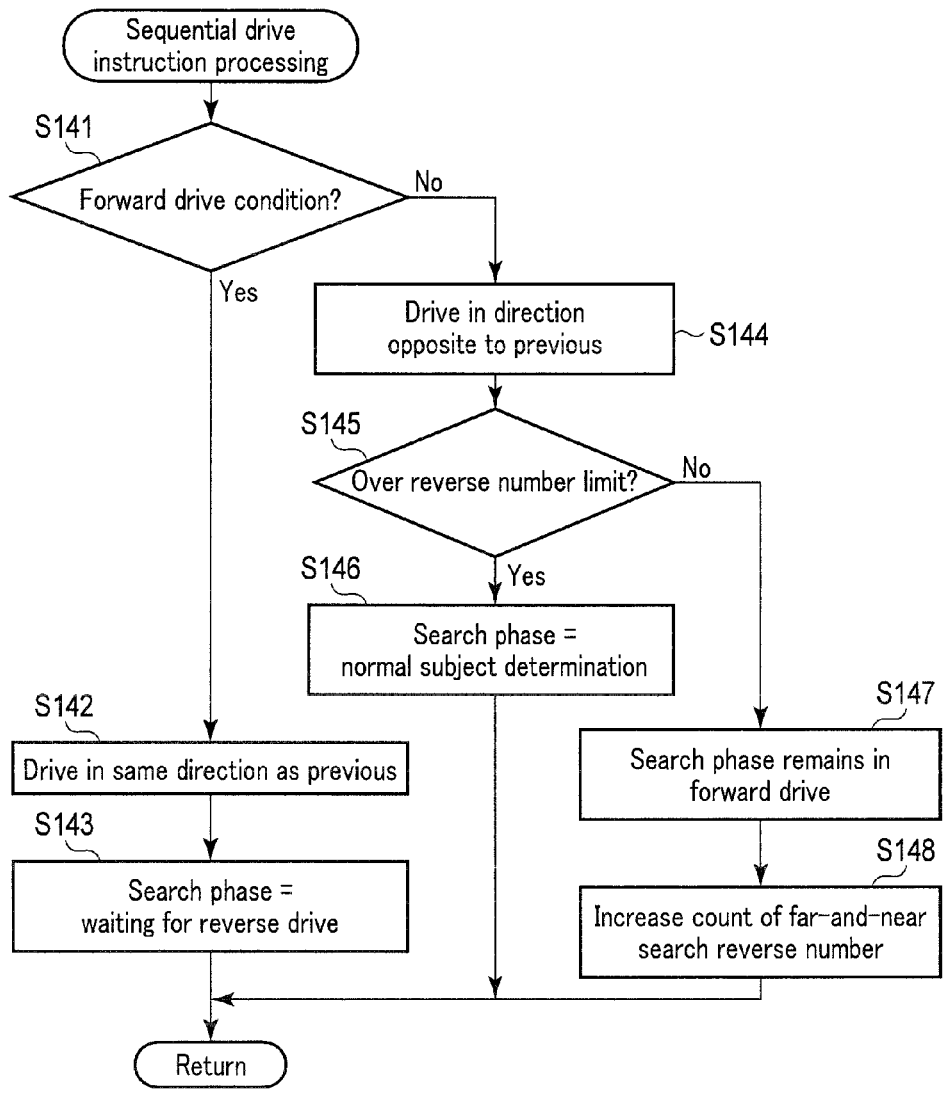
FIG. 29 is a flowchart showing forward drive instruction processing.

Here, back to the explanation of FIG. 27, the AF control circuit 1302 performs forward drive instruction processing in step S123. The processing in FIG. 27 then ends. The forward drive instruction processing is described. FIG. 29 is a flowchart showing the forward drive instruction processing. In step S141, the AF control circuit 1302 determines whether a forward drive condition is satisfied. One of the following conditions is satisfied when the forward drive condition is satisfied.

(1) The current direction judgment result is the same as the previous direction judgment result.

(2) The current direction judgment result is "indeterminate".

When it is determined in step S141 that the forward drive condition is satisfied, the processing shifts to step S142. When it is determined in step S141 that the forward drive condition is not satisfied, the processing shifts to step S144.

In step S142, the AF control circuit 1302 issues a lens drive instruction to the focus adjustment mechanism 104 to drive the focus lens in the same direction as the previous drive direction. The processing then shifts to step S143.

In step S143, the AF control circuit 1302 causes the state of the search phase to make the transition to "waiting for reverse drive". The processing in FIG. 29 then ends. Consequently, the processing branches to step S124 in the next determination in step S121 in FIG. 27. The processing in step S143 is processing to perform reverse drive once in three frames.

In step S144, the AF control circuit 1302 issues a lens drive instruction to the focus adjustment mechanism 104 to drive the focus lens in a direction opposite to the previous drive direction. The processing then shifts to step S145.

In step S145, the AF control circuit 1302 determines whether the number of reverse drives is more than a threshold. When it is determined in step S145 that the number of reverse drives is more than the threshold, the processing shifts to step S146. When it is determined in step S145 that the number of reverse drives is not more than the threshold, the processing shifts to step S147.

In step S146, the AF control circuit 1302 causes the state of the search phase to make the transition to "normal subject determination". The processing in FIG. 29 then ends. A large number of reverse drives means that the performance of the direction judgment is not high because the state of the imaging device 100 is unstable or because the state of the subject is unstable. In this case, the AF control circuit 1302 does not keep on the processing for the far-and-near mixing subject which requires high-precision processing, and switches to the processing for the normal subject which does not require high-precision processing. This causes the state of the search phase to make the transition to "normal subject determination". This causes the focus state to make the transition to "normal" in the aforementioned far-and-near mixture determination processing. The processing is then switched to the processing for the normal subject.

In step S147, the AF control circuit 1302 leaves the state of the search phase "forward drive". In step S148, the AF control circuit 1302 increases the count of the number of reverse drives by one. The processing in FIG. 29 then ends.

Here, back to the explanation of FIG. 27, the AF control circuit 1302 performs reverse drive instruction processing in step S124. The processing in FIG. 27 then ends. The reverse drive instruction processing is described. In the reverse drive instruction processing, a current drive direction, a step amount (drive amount), and the state of the search phase are respectively decided on the basis of the current direction judgment result and the previous drive direction. FIG. 30 is a diagram showing a table used in the reverse drive instruction processing.

In FIG. 30, when the current direction judgment result is "far" and when the previous drive direction is "far", the AF control circuit 1302 issues a lens drive instruction to the focus adjustment mechanism 104 to drive the focus lens in the "near" direction. The step amount in this instance is a predetermined number of times as great as that in the previous driving (1.5 times in FIG. 30). The AF control circuit 1302 then causes the state of the search phase to make the transition to "far-and-near mixture determination". The reverse drive processing then ends. The step amount is 1.5 times as great as that in the previous driving in FIG. 30, but may be changed to, for example, 1.3 times or 1.7 times if necessary. For example, the step amount may be changed in accordance with a backlash amount regarding focus lens driving of an attached interchangeable lens acquired from the interchangeable lens by communication or in accordance with conditions of the stability of the subject. When it is determined that the backlash amount is great or the stability of the subject is low, the step amount is 1.7 times which is a higher numerical value.

In FIG. 30, when the current direction judgment result is "far" and when the previous drive direction is "near", the AF control circuit 1302 issues a lens drive instruction to the focus adjustment mechanism 104 to drive the focus lens in the "far" direction. The step amount in this instance is a predetermined number of times as great as that in the previous driving (1.5 times in FIG. 30). The AF control circuit 1302 then causes the state of the search phase to make the transition to "far-and-near mixture determination". The reverse drive processing then ends.

In FIG. 30, when the current direction judgment result is "near" and when the previous drive direction is "far", the AF control circuit 1302 issues a lens drive instruction to the focus adjustment mechanism 104 to drive the focus lens in the "near" direction. The step amount in this instance is a predetermined number of times as great as that in the previous driving (1.5 times in FIG. 30). The AF control circuit 1302 then causes the state of the search phase to make the transition to "far-and-near mixture determination". The reverse drive processing then ends.

In FIG. 30, when the current direction judgment result is "near" and when the previous drive direction is "near", the AF control circuit 1302 issues a lens drive instruction to the focus adjustment mechanism 104 to drive the focus lens in the "near" direction. The step amount in this instance is the same as that in the previous driving. The AF control circuit 1302 then leaves the state of the search phase "waiting for reverse drive". The reverse drive processing then ends.

In FIG. 30, when the current direction judgment result is "indeterminate", the AF control circuit 1302 issues a lens drive instruction to the focus adjustment mechanism 104 to drive the focus lens in the same direction as the previous drive direction. The step amount in this instance is the same as that in the previous driving. The AF control circuit 1302 then causes the state of the search phase to make the transition to "normal subject determination". The reverse drive processing then ends.

FIG. 31 is a graph showing the relation between the state of the search phase and lens drive, and is a graph in which the drive direction during the initial drive instruction processing is the "far" direction. Here, a solid line in FIG. 31 indicates a contrast curve of the small region. In FIG. 31, the contrast curve of one small region is represented. A broken line in FIG. 31 indicates a contrast curve of the middle region or the large region.

When subjects are mixed far and near, the contrasts of the subjects at different distances are acquired in the middle region or the large region, so that the contrast curve tends to be more on the far side. In contrast, in the small regions, the contrast of each of the subjects can be acquired, so that the contrast curve tends to be more on the near side than in the middle region or the large region.

When the drive direction in the initial drive instruction processing is the "far" direction, there is a possibility that the contrast of the middle region or the large region which is influenced by the far-and-near mixing subject may be acquired, as shown in FIG. 31. In this case, there is a strong possibility that the direction judgment result in the next direction judgment processing may also be "far". In this instance, the forward drive condition is satisfied in forward drive instruction processing, and the focus lens is driven in the "far" direction. The state of the search phase then changes to "waiting for reverse drive". Thus, the drive direction is switched to "near" in the next reverse drive instruction processing. The state of the search phase then changes to "far-and-near mixture determination". Accordingly, the far-and-near mixture determination processing is performed, and the focus state changes to "far-and-near mixture". Therefore, the contrasts of the small regions are also taken into consideration in the next direction judgment processing, and the focus lens is driven so that the contrast curves of the small regions can also be acquired.

In such driving, reverse drive is only performed once in three frames, so that the deterioration of the appearance of the live-view is reduced as compared to the case where reverse drive is performed every frame as in wobbling.

FIG. 32 is a graph showing the relation between the state of the search phase and lens drive, and is a graph in which the drive direction during the initial drive instruction processing is the "near" direction. Here, a solid line in FIG. 32 indicates a contrast curve of the small region. A broken line in FIG. 32 indicates a contrast curve of the middle region or the large region.

When the drive direction in the initial drive instruction processing is the "near" direction, there is a possibility that the contrast curve of the small region may be acquired, as shown in FIG. 32. In this case, there is a strong possibility that the direction judgment result in the next direction judgment processing may also be "near". In this instance, the forward drive condition is satisfied in the forward drive instruction processing, and the focus lens is driven in the "near" direction. The state of the search phase then changes to "waiting for reverse drive". In the example of FIG. 32, the drive direction in the next reverse drive instruction processing remains "near". The state of the search phase remains "waiting for reverse drive". In this case, the far-and-near mixture determination processing is not performed, and the driving of the focus lens is continued without the evaluation values of the small regions taken into consideration. However, because the focus positions of the small regions tend to be more on the near side than that of the middle region or the large region, it is possible to come close to the focus positions of the small regions in the end.

In such driving, extra reverse drive is not performed, so that the deterioration of the appearance of the live-view is reduced as compared to the case where reverse drive is performed every frame as in wobbling. Moreover, driving in the "near" direction has priority, so that the focus lens is more easily driven to the peak positions of the contrast curves of the small regions. Thus, a direction judgment by the evaluation values of the small regions is easier.

As described above, in the present embodiment, AF is performed with the combination of slight driving of the focus lens in the first direction and slight driving of the focus lens in the second direction. In this instance, the number of times of driving the focus lens in the second direction is smaller than the number of times of driving the focus lens in the first direction so that the appearance of the live-view can be improved as compared to the case where reverse drive is performed every frame.

While the evaluation of the contrasts of the small regions is preferred as measures against the far-and-near mixing subject, the contrasts of the small regions are subject to the change of the imaging device 100, the change of the subject, and the like. Thus, in the present embodiment, a first number of times of driving in the first direction are performed, and then a second number of times of driving in the second direction are performed, before the small region presence determination processing is performed. That is, in the present embodiment, the direction judgment result of the middle region or the large region is used in the first number of times of driving in the first direction, and in the second number of times of driving in the second direction, whether to use the direction judgment results of the small regions is determined by the small region presence determination processing. When the contrasts of the small regions are correctly acquired, the changes of the evaluation values are not monotonous changes, and because of this nature, it is possible to determine whether to use the direction judgment results of the small regions. Consequently, it is also possible to stably focus the focus lens on the far-and-near mixing subject even if frame-by-frame reverse drive is not performed.

Furthermore, the contrast curves of the small regions tend to be more on the near side, and by use of this nature, driving in the "near" direction has priority while the direction judgment result is "near", so that the number of reverse drives is reduced, and the contrast curves of the small regions are more easily acquired.

While the present invention has been described above in connection with the embodiment, it should be understood that the present invention is not limited to the embodiment described above, and various modifications and applications can be made within the scope of the spirit of the present invention. For example, in the embodiment described above, the number of times of driving in the first direction (first number of times) in the step phase is two, and the number of times of driving in the second direction (second number of times) is one. However, the first number of times and the second number of times can be suitably set if the first number of times is larger than the second number of times. For example, the first number of times is three and the second number of times is one so that switch drive will be performed once in four frames.

Each of the processes according to the embodiment described above can also be stored as a program that can be executed by a CPU or the like as a computer. This can also be stored and distributed in a storage medium of an external storage device such as a memory card, a magnetic disk, an optical disk, or a semiconductor memory. The CPU or the like then reads the program stored in the storage medium of the external storage device, and can perform the processing described above when the operation is controlled by the read program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus adjustment device which includes an imager to receive a light flux passing through an imaging lens including a focus lens and then generate an image signal and which performs focus adjustment on the basis of the image signal, the focus adjustment device comprising:
   a focus detection region setting unit which sets focus detection regions in a region of the imager where the light flux is received, the focus detection regions being at least partly the same and being different in size;
   a direction judgment unit which calculates a first evaluation value based on an image signal of a first focus detection region among the focus detection regions to judge a drive direction of the focus lens to be in focus, and calculates a second evaluation value based on an image signal of at least one second focus detection region smaller than the first focus detection region among the focus detection regions to judge a drive direction of the focus lens to be in focus; and
   a control unit which controls a focus adjustment operation on the basis of the drive direction judged by the direction judgment unit,
   wherein the control unit determines whether a change of the second evaluation value is a monotonous change when the focus lens is slightly driven a first number of times in a first direction judged on the basis of the first evaluation value and the focus lens is slightly driven a second number of times smaller than the first number of times in a second direction opposite to the first direction, and the control unit performs focus adjustment on the basis of the second evaluation value when the change of the second evaluation value is not a monotonous change, and
   the first number of times is larger than or equal to 2.

2. The focus adjustment device according to claim 1, wherein the direction judgment unit judges a drive direction of the focus lens on the basis of each of the second evaluation values calculated for each of the second focus detection regions, and
   the control unit performs focus adjustment on the basis of the second evaluation value when the number of drive directions indicating a near direction is equal to or more than a predetermined number among the drive directions judged by the respective second evaluation values.

3. The focus adjustment device according to claim 1, wherein when the first direction is a far direction, the control unit slightly drives the focus lens twice in the far direction, and then slightly drives the focus lens once in a near direction which is the second direction.

4. The focus adjustment device according to claim 1, wherein when the first direction is a near direction, the control unit slightly drives the focus lens more than once in the near direction and at the same time causes the direction judgment unit to judge the drive direction, and the control unit slightly drives the focus lens once in a far direction which is the second direction after the drive direction judged by the direction judgment unit changes from the near direction to the far direction.

5. The focus adjustment device according to claim 1, wherein a drive amount of the focus lens in the second direction is greater than a drive amount of the focus lens in the first direction.

6. The focus adjustment device according to claim 1, further comprising a subject condition detection unit which detects a change in a subject condition on the basis of a difference between contrasts that are calculated based on image signals acquired at different timings, or a motion vector calculated based on the image signals acquired at different timings,
   wherein, when the subject condition detection unit detects the change in the subject condition on the basis of a change of contrast or a change of a motion vector based on the image signal from the imager, the control unit determines whether the change of the second evaluation value is a monotonous change, and performs the focus adjustment on the basis of the second evaluation value when the change of the second evaluation value is not a monotonous change.

7. The focus adjustment device according to claim 1, further comprising a posture change determination unit which includes a circuit for detecting an angular velocity with a gyro sensor and acquires information regarding a posture of the focus adjustment device to determine whether or not there is a posture change on the basis of the detected angular velocity,
   when the posture change determination unit detects a panning movement or a tilting movement of the focus adjustment device, the control unit determines whether a change of the second evaluation value is a monotonous change, and performs the focus adjustment on the basis of the second evaluation value when the change of the second evaluation value is not a monotonous change.

8. The focus adjustment device according to claim 1, wherein the control unit performs focus adjustment on the basis of the first evaluation value when a change of the second evaluation value is a monotonous change.

9. A focus adjustment device which includes an imager to receive a light flux passing through an imaging lens including a focus lens and then generate an image signal and which performs focus adjustment on the basis of the image signal, the focus adjustment device comprising:
- a focus detection region setting unit which sets focus detection regions in a region of the imager where the light flux is received, the focus detection regions being at least partly the same and being different in size;
- a direction judgment unit which calculates a first evaluation value based on an image signal of a first focus detection region among the focus detection regions to judge a drive direction of the focus lens to be in focus, and calculates a second evaluation value based on an image signal of at least one second focus detection region smaller than the first focus detection region among the focus detection regions to judge a drive direction of the focus lens to be in focus; and
- a control unit which controls a focus adjustment operation on the basis of the direction judged by the direction judgment unit,
- wherein the control unit determines whether a far-and-near mixing subject is present from a change of the second evaluation value when the focus lens is slightly driven a first number of times in a first direction judged on the basis of the first evaluation value and the focus lens is slightly driven a second number of times smaller than the first number of times in a second direction opposite to the first direction, and the control unit performs focus adjustment on the basis of the second evaluation value when the far-and-near mixing subject is present, and
- the first number of times is larger than or equal to 2.

10. The focus adjustment device according to claim 9, wherein when the first direction is a far direction, the control unit slightly drives the focus lens twice in the far direction, and then slightly drives the focus lens once in a near direction which is the second direction.

11. The focus adjustment device according to claim 9, wherein when the first direction is a near direction, the control unit slightly drives the focus lens more than once in the near direction and at the same time causes the direction judgment unit to judge the drive direction, and the control unit slightly drives the focus lens once in a far direction which is the second direction after the drive direction judged by the direction judgment unit changes from the near direction to the far direction.

12. The focus adjustment device according to claim 9, wherein a drive amount of the focus lens in the second direction is greater than a drive amount of the focus lens in the first direction.

13. A focus adjustment method to perform focus adjustment on the basis of an image signal from an imager which receives a light flux passing through an imaging lens including a focus lens and then generates the image signal, the focus adjustment method comprising:

setting focus detection regions in a region of the imager where the light flux is received, the focus detection regions being at least partly the same and being different in size;
judging a drive direction of the focus lens to be in focus on the basis of a first evaluation value based on an image signal of a first focus detection region among the focus detection regions;
judging a drive direction of the focus lens to be in focus on the basis of a second evaluation value based on an image signal of at least one second focus detection region smaller than the first focus detection region among the focus detection regions;
determining whether a change of the second evaluation value is a monotonous change when the focus lens is slightly driven a first number of times in a first direction judged on the basis of the first evaluation value and the focus lens is slightly driven a second number of times smaller than the first number of times in a second direction opposite to the first direction, and the first number of times is larger than or equal to 2; and
performing focus adjustment on the basis of the second evaluation value when the change of the second evaluation value is not a monotonous change.

14. The focus adjustment method according to claim 13, wherein judging the drive direction comprises judging a drive direction of the focus lens on the basis of each of the second evaluation values calculated for each of the second focus detection regions, and
performing focus adjustment comprises performing focus adjustment on the basis of the second evaluation value when the number of drive directions indicating a near direction is equal to or more than a predetermined number among the drive directions judged by the respective second evaluation values.

15. The focus adjustment method according to claim 13, wherein the determination comprises when the first direction is a far direction, slightly driving the focus lens twice in the far direction, and then slightly driving the focus lens once in a near direction which is the second direction.

16. The focus adjustment method according to claim 13, wherein the determination comprises when the first direction is a near direction, slightly driving the focus lens more than once in the near direction and at the same time judging the drive direction, and slightly driving the focus lens once in a far direction which is the second direction after the judged drive direction changes from the near direction to the far direction.

17. The focus adjustment method according to claim 13, wherein a drive amount of the focus lens in the second direction is greater than a drive amount of the focus lens in the first direction.

18. A focus adjustment method to perform focus adjustment on the basis of an image signal from an imager which receives a light flux passing through an imaging lens including a focus lens and then generates the image signal, the focus adjustment method comprising:
setting focus detection regions in a region of the imager where the light flux is received, the focus detection regions being at least partly the same and being different in size;
judging a drive direction of the focus lens to be in focus on the basis of a first evaluation value based on an image signal of a first focus detection region among the focus detection regions;
judging a drive direction of the focus lens to be in focus on the basis of a second evaluation value based on an image signal of at least one second focus detection region smaller than the first focus detection region among the focus detection regions;

determining whether a far-and-near mixing subject is present from a change of the second evaluation value when the focus lens is slightly driven a first number of times in a first direction judged on the basis of the first evaluation value and the focus lens is slightly driven a second number of times smaller than the first number of times in a second direction opposite to the first direction, and the first number of times is larger than or equal to 2; and performing focus adjustment on the basis of the second evaluation value when the far-and-near mixing subject is present.

19. The focus adjustment method according to claim 18, wherein judging the drive direction comprises when the first direction is a far direction, slightly driving the focus lens twice in the far direction, and then slightly driving the focus lens once in a near direction which is the second direction.

20. The focus adjustment method according to claim 18, wherein the determination comprises when the first direction is a near direction, slightly driving the focus lens more than once in the near direction and at the same time judging the drive direction, and slightly driving the focus lens once in a far direction which is the second direction after the judged drive direction changes from the near direction to the far direction.

21. The focus adjustment method according to claim 18, wherein a drive amount of the focus lens in the second direction is greater than a drive amount of the focus lens in the first direction.

\* \* \* \* \*